(12) United States Patent
Mazzarella et al.

(10) Patent No.: US 10,404,942 B2
(45) Date of Patent: *Sep. 3, 2019

(54) BIOSENSOR-TRIGGERED MULTIMEDIA COLLABORATION

(71) Applicant: MUTUALINK, INC., Wallingford, CT (US)

(72) Inventors: Joseph R. Mazzarella, Tolland, CT (US); Michael S. Wengrovitz, Concord, MA (US)

(73) Assignee: Mutualink, Inc., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,590

(22) Filed: Jul. 30, 2018

(65) Prior Publication Data

US 2018/0338115 A1 Nov. 22, 2018

Related U.S. Application Data

(63) Continuation of application No. 15/242,792, filed on Aug. 22, 2016, now Pat. No. 10,038,875, which is a continuation of application No. 14/642,325, filed on Mar. 9, 2015, now Pat. No. 9,426,433.

(51) Int. Cl.
*H04N 7/14* (2006.01)
*H04N 7/18* (2006.01)
(Continued)

(52) U.S. Cl.
CPC .......... *H04N 7/147* (2013.01); *H04L 65/102* (2013.01); *H04L 65/403* (2013.01); *H04L 67/12* (2013.01);
(Continued)

(58) Field of Classification Search
CPC ... H04N 7/14; H04N 5/77; H04N 7/18; H04L 29/06; H04L 29/08; G06F 1/163; G08B 21/0476; G08B 25/016
(Continued)

(56) References Cited

U.S. PATENT DOCUMENTS 6,046,712 A 4/2000 Beller et al.
7,193,644 B2 3/2007 Carter
(Continued)

OTHER PUBLICATIONS

Alshamrani, M. et al., "SIP-Based Internetwork System Between Future IP Networks and ZigBee Based Wireless Personal Area Networks (WPAN)," 2012 4th Computer Science and Engineering Conference (CEEC), IEEE, University of Essex, UK, pp. 206-211 (Sep. 12, 2012).

(Continued)

*Primary Examiner* — Melur Ramakrishnaiah
(74) *Attorney, Agent, or Firm* — Sterne, Kessler, Goldstein & Fox P.L.L.C.

(57) ABSTRACT

Embodiments include a computer program product for using a biosensor worn by a user to trigger an event and activate a camera worn by the user to begin streaming and/or recording video data. The biosensor trigger also initiates a real time multimedia collaboration session with the user wearing the biosensor and one or more designated parties. Through an interoperability gateway device, a voice communications device of the user is bridged with voice communications devices of the designated parties, and the video data is electronically transmitted to the designated parties. Thus, the designated parties may have real time voice communications among each other and with the user, and the designated parties may also view the video data in real time. Embodiments also determine when an event has ended and deactivates the camera worn by the user.

20 Claims, 13 Drawing Sheets

US 10,404,942 B2
Page 2

(51) Int. Cl.
*H04N 5/77* (2006.01)
*H04L 29/06* (2006.01)
*H04L 29/08* (2006.01)
*H04W 76/50* (2018.01)

(52) U.S. Cl.
CPC ............. *H04N 5/772* (2013.01); *H04N 7/185* (2013.01); *H04N 7/188* (2013.01); *H04W 76/50* (2018.02)

(58) Field of Classification Search
USPC ................. 348/14.01–14.16; 379/37, 45
See application file for complete search history.

(56) References Cited

U.S. PATENT DOCUMENTS

| | | |
|---|---|---|
| 7,643,445 B2 | 1/2010 | Mills et al. |
| 7,958,824 B2 | 6/2011 | Stewart |
| 8,313,416 B2 | 11/2012 | Ellis et al. |
| 8,320,874 B2 | 11/2012 | Mills et al. |
| 8,364,153 B2 | 1/2013 | Boucher et al. |
| 8,811,940 B2 | 8/2014 | Boucher et al. |
| 9,426,433 B1 | 8/2016 | Mazzarella et al. |
| 10,038,875 B2 | 7/2018 | Mazzarella et al. |
| 2002/0034319 A1 | 3/2002 | Tumey et al. |
| 2008/0208016 A1 | 8/2008 | Hughes et al. |
| 2009/0174547 A1* | 7/2009 | Greene .................. A62B 99/00 340/539.13 |
| 2012/0322402 A1* | 12/2012 | Sennett .................. H04W 4/90 455/404.1 |
| 2013/0198517 A1 | 8/2013 | Mazzarella |
| 2013/0331139 A1 | 12/2013 | Mills et al. |
| 2014/0232885 A1* | 8/2014 | Slater ..................... H04N 5/232 348/207.11 |
| 2014/0368643 A1 | 12/2014 | Siegel et al. |
| 2014/0368658 A1 | 12/2014 | Costa et al. |
| 2015/0084984 A1 | 3/2015 | Tomii et al. |
| 2016/0233946 A1 | 8/2016 | Wengrovitz et al. |
| 2017/0048238 A1 | 2/2017 | Saito |

OTHER PUBLICATIONS

Lakas, A. et al., "A framework for SIP-based wireless medical applications," 2005 IEEE 61st Vehicular Technology Conference, vol. 5, IEEE, Piscataway, NJ, USA, 5 pages (2005).

Song, W. et al., "A Emergency Communication System Based on WMN in Underground Mine," 2010 International Conference on Computer Application and System Modeling (ICCASM 2010), IEEE, Piscataway, NJ, USA, pp. V4-624-V4-627, (2010).

Notification of Transmittal of the International Search Report and the Written Opinion of the International Searching Authority, for PCT Appl. No. PCT/US2016/021364, 17 pages, dated Jun. 3, 2016.

* cited by examiner

BIOSENSOR-TRIGGERED MULTIMEDIA COLLABORATION

CROSS-REFERENCE TO RELATED APPLICATIONS

This application is a continuation of allowed U.S. application Ser. No. 15/242,792, filed Aug. 22, 2016, entitled "System and Method for Biosensor-Triggered Multimedia Collaboration" ("'792 application"), which is incorporated herein by reference in its entirety. The '792 application is a continuation of allowed U.S. application Ser. No. 14/642,325, filed Mar. 9, 2015, entitled "System and Method for Biosensor-Triggered Multimedia Collaboration," which is incorporated herein by reference in its entirety.

BACKGROUND

Field

The embodiments generally relate to electronic communications among secure communities, and more particularly, to providing biosensor-triggered, real-time video data in multimedia collaboration sessions in and among secure communities including incident communications networks.

Background

Presently, a plethora of disparate communications resources exist including resources using private wireless communications (e.g., public safety and first responder communications networks), public switched network communications resources, public wireless networks, networks of video surveillance devices, private security networks, and the like. Additionally, millions of consumers and public officials are now equipped with smartphone devices that include multiple communications abilities including both voice and video communications.

Often these communications resources cannot communicate with each other. For example, private wireless communication networks, such as those used by public safety or commercial users, are typically isolated from one another and utilize different and often incompatible technologies. While interoperability products are available to interconnect such diverse systems, cooperation among the entities involved is often a barrier to full and scalable implementation. Thus, first responder communication systems exist (e.g., silo-ed communications systems), where control of the resources of each organization coupled to the system is controlled by a central administrator or controller, and each organization providing resources to the system must relinquish control of its resources to the central administrator. The organization responsible for the operation of its radio system(s) may be unable or unwilling to grant control of its resources either to peer organizations or to a higher-level organization.

U.S. Pat. No. 7,643,445, entitled Interoperable Communications System and Method of Use, issued on Jan. 5, 2010, and U.S. Pat. No. 8,320,874, entitled System and Method for Establishing an Incident Communications Network, issued on Nov. 27, 2012, both of which are incorporated by reference in their entirety, describe systems and methods for providing an interoperable communications system ("interop system," also referred to as an Incident Communications Network) including a plurality of otherwise disjunct or disparate communications systems that addressed the deficiencies of prior art systems. The '445 and '874 patents specifically describe methods for establishing an incident communications network that enables interoperable communications among communications resources controlled by multiple organizations during an incident involving emergency or pre-planned multi-organization communications wherein a communications resource is controlled by an administrator within an organization.

Additionally, U.S. Pat. No. 8,364,153, entitled Mobile Interoperability Workstation Controller Having Video Capabilities within an Incident Communications Network, issued on Jan. 29, 2013, ("Mobile IWC Patent") which is also incorporated herein by reference in its entirety, extends the concepts of the '445 and '874 patents. Namely, the Mobile IWC Patent includes enhanced video capture and streaming capabilities that are integrated with incident information and events to facilitate improved management and analysis of incidents or events in which an incident communications network is employed.

U.S. Pat. No. 8,811,940, entitled Dynamic Asset Marshalling Within an Incident Communications Network, issued on Aug. 19, 2014, ("Marshalling Patent") which is also incorporated herein by reference in its entirety, extends the concepts of the '445 and '874 patents. Namely, the Marshalling Patent provides systems and methods that marshal resources into an incident communications network based on a variety of factors, such as the type of incident and the type of resource being marshaled.

U.S. Patent Publication 2013/0198517, entitled Enabling Ad Hoc Trusted Connections Among Enclaved Communication Communities, filed on Mar. 13, 2013, ("Enclaved Application") which is also incorporated herein by reference in its entirety, extends the concepts of the '445 and '874 patents. Namely, the Enclave Application presents systems and methods for dynamic access among secure communities, such as incident communications networks, that enables communication resources of a first secure community to securely access and/or utilize communication resources within other secure communities.

Inadequate Body-Worn Cameras

The use of body worn cameras by law enforcement personnel and soldiers is becoming more common to document events as they occur in the field. In some instances, systems have been devised that enable body-worn cameras to record video data and stream the video data to another receiving point such as a control or viewing station. Streaming can be accomplished over a wireless network connection via a radio transceiver coupled to a body worn video camera.

There are at least three general technical problems with existing body-worn cameras. First, a user (e.g., a law enforcement officer) must activate the body worn camera and users often forget to do so during chaotic or stressful situations. Second, if the body-worn camera is left in an active recording state to avoid the first problem, other issues arise. For example, the practical duration for active recording is limited by the finite camera-based data storage capacity of the body-worn camera device. When the camera-based data storage capacity is increased to accommodate the continuous recording state, the size of the body-worn device likewise increases and becomes less desirable. Alternatively, the camera-based data storage may be overwritten when capacity is reached, but important video data may be lost. If streaming is employed to offload the video data from the camera-based data storage by transmitting the video data to a different storage, the video data transmission consumes significant wireless bandwidth thereby resulting in excessive costs especially when utilizing commercial wireless broadband services. In addition, continuous recording and/or streaming is power intensive and small batteries in a body-worn camera are typically insufficient for extended use.

The third general technical problem is that current body-worn cameras are standalone systems and are not connected to, or integrated with communications devices typically used in responding situations, such as radios and mobile phone devices. Even when the video data is streamed to a different storage, the video data is electronically transmitted to a fixed and pre-determined reception point not accessible by users of typical communications devices. In the case of a distress situation, voice communication is typically established over a radio channel enabling for example, push to talk (PTT) communications among radio end points (e.g., users with PTT mobile units) in the same channel and dispatch communications centers. A first person viewing the video data streamed from a body-worn camera is not able to speak with the user wearing the body-worn camera. And, a second person that can speak (e.g., have voice communications established) with the user wearing the body-worn camera cannot view the video data streamed from the user's body-worn camera. When a third person is from a different agency or a different department, the third person can neither speak with the user wearing the body-worn camera, nor view video data from the user's body-worn camera in the absence of pre-planning and the issuance of access credentials. The various silo-ed communications systems limit the ability for personnel to communicate in real time and share video data streamed from a body-worn camera in a seamless and cohesive manner.

BRIEF SUMMARY OF THE INVENTION

What is needed is a system, method, and computer program product for using a biosensor worn by a user to trigger an event and activate a camera worn by the user to begin streaming and/or recording video data. The biosensor trigger also initiates a real time multimedia collaboration session with the user wearing the biosensor and one or more designated parties. Through an interoperability gateway device, a voice communications device of the user is bridged with voice communications devices of the designated parties, and the video data is electronically transmitted to the designated parties. Thus, the designated parties may have real time voice communications among each other and with the user, and the designated parties may also view the video data in real time. Embodiments also determine when an event has ended and deactivates the camera worn by the user.

Embodiments include a system, method, and computer medium storage for electronically receiving a first biometric signal from a biosensor worn by a user, wherein the biosensor is associated with a first interoperability workstation (IWS) of a first agency, and electronically determining using the biometric signal, when an event occurs. When an event occurs, embodiments include electronically transmitting an activation message to a camera device worn by the user to begin recording and transmitting video data, and electronically transmitting an event alert to the first IWS. Based on rules, the first IWS establishes a biosensor-triggered multimedia collaboration session including one or more first resources under control of the first IWS including a voice communication device of the user, and the video data transmitted by the camera device. In addition, the one or more first resources receive in real time, the video data transmitted by the camera device via an interoperability gateway device and have voice communications with the user. Embodiments also include electronically receiving a second biometric signal from the biosensor, and electronically determining using the second biometric signal, when the event has ceased. When the event has ceased, embodiments further include electronically transmitting a deactivation message to the camera device to cease recording video data according to rules, such as a prescribed period of time after event cessation.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 9:
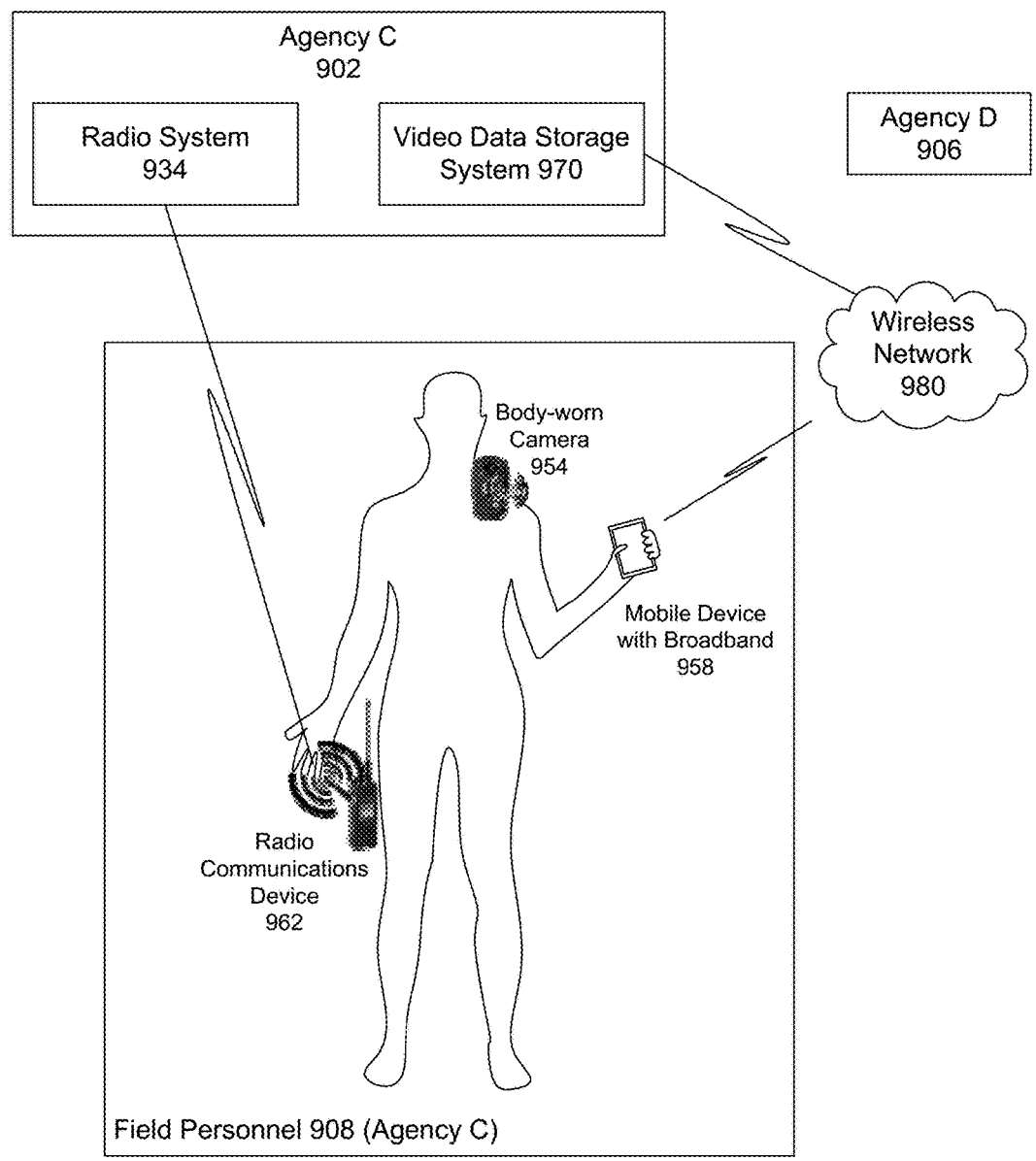
FIG. 9 is an example conventional system.

Conventional body-worn cameras are standalone systems and are not connected to, or integrated with communications devices typically used in responding situations, such as radios and mobile phone devices. FIG. 9 is an example conventional system 900. Field personnel 908 of Agency C may carry radio communications device 962, body-worn camera 954, and mobile device with broadband data 958 such as a smart phone. Voice communication is typically established over a radio channel enabling for example, push to talk (PTT) communications among radio communications device 962 and radio communications devices associated other personnel of Agency C 902 in the same channel and dispatch communications centers. Field personnel 908 may also use mobile device with broadband 958 that utilizes wireless network 980 to establish voice communications with personnel of Agency C that may include PTT communications.

When field personnel 908 activates body-worn camera 954, video data from body-worn camera 954 is recorded and may be forwarded to video data storage system 970 that is a fixed and pre-determined reception point. A first personnel of Agency C that can view the video data in video data storage system 970 cannot speak with field personnel 908 because voice communications have not been established with field personnel 908. Further, a second personnel of Agency C that has established voice communications with the field personnel 908 wearing the body-worn camera 954 does not have access to video data storage system 970 and thus, cannot view the video data streamed from body-worn camera 954. In addition, a third personnel from Agency D 906 can neither speak with field personnel 908 wearing body-worn camera 954, nor view video data from video data storage system 970 from body-worn camera 954 in the absence of pre-planning and the issuance of access credentials. The various silo-ed communications systems, voice communications (e.g., radio system 934) and video communications (e.g., video data storage system 970), and separate agency system (e.g., Agency D 906 communications) limit the ability for personnel to communicate in real time and share video data streamed from a body-worn camera.

Overview

Figure 1A:
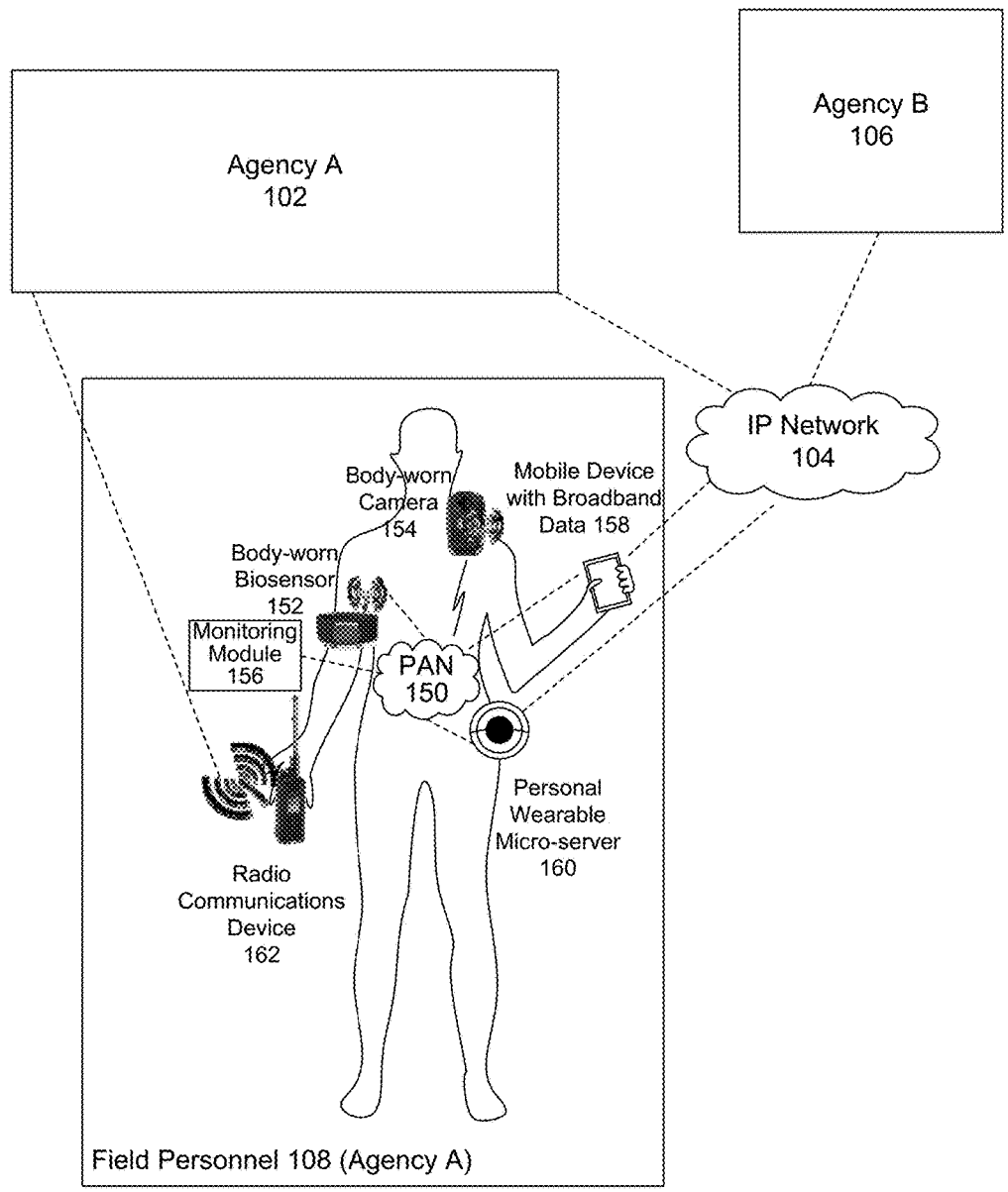
FIG. 1A illustrates a diagram of a system according to an embodiment.

FIG. 1A illustrates a diagram of a system 100A according to an embodiment. FIG. 1A includes Agency A 102, Agency B 106, and field personnel 108 that is associated with Agency A, all of which may have access to an Internet Protocol (IP) network 104 which may be a wired and/or wireless network, and may include any combination of local area networks (LANs), wide area networks (WANs), the Internet, a wide area data communications network, etc. An agency is a secure community that includes a collection of communications and/or media resources maintained by an administrator. As mentioned above, the '445 and '874 patents describe methods for establishing an incident communications network that enables interoperable communications among communications resources such as Agency A 102 and Agency B 106, and the Enclaved Application includes systems and methods for dynamic access among secure communities such as Agency A 102 and Agency B 106.

Field personnel 108 (e.g., an officer, a first responder, an agent) associated with Agency A (e.g., a police department, a fire department, or the Federal Bureau of Investigations (FBI)), may carry and/or wear devices including but not limited to at least one of body-worn biosensor 152, body-worn camera 154, radio communications device 162, mobile device with broadband data 158, and personal wearable micro-server 160 that may be coupled via a wired or wireless data communications link and/or personal area network (PAN) 150. The data communications link and/or PAN 150 may include at least one of a wired interface including but not limited to a universal serial bus (USB) or other wired interface, or a wireless interface including but not limited to: a Bluetooth, Wi-Fi, Zigbee, or other wireless protocol.

For example, field personnel 108 wears a biometric sensor, body-worn biosensor 152, which monitors his heart rate. Biometric data (e.g., a heart rate) from body-worn biosensor 152, is electronically transmitted over PAN 150 to a software monitoring application, monitoring module 156. Monitoring module 156 operates on a small body-worn computing device (e.g., personal wearable micro-server 160) or a handheld computing device (e.g., mobile device with broadband data 158) that has interoperability gateway functions to access IP network 104. Interoperability gateway functions (e.g., community gateway controller functions) are described in the Enclaved Application. Monitoring module 156 which is coupled to body-worn biosensor 152 and body-worn camera 154 via PAN 150. Monitoring module 156 monitors biometric data outputs (e.g., the heart rate) from body-worn biosensor 152. These biometric data are electronically interpreted by a set of rules, parameters, or algorithms that determine whether the biometric data meet or exceed an established trigger threshold. In an example, monitoring module 156 is programmed such that an activation message is triggered once the officer's heart rate exceeds 120 beats per minute. Once monitoring module 156 receives biometric data (e.g., the heart rate) from body-worn biosensor 152 via PAN 150, and detects that the heart rate is in excess of 120 beats per minute, monitoring module 156 electronically transmits the activation message via PAN 150 to body-worn camera 154 to commence recording and/or streaming video data. Monitoring module 156 also electronically transmits via an interoperability gateway device, an event alert message via a wireless network connection over IP network 104, to Agency A 102 that is monitoring field personnel 108 (e.g., the officer). In this example, based on rules, the received event alert message initiates a biosensor-triggered multimedia communications session. In conjunction with receipt of the event alert message, Agency A 102 includes one or more agency media resources such as radio, telephone or other voice communication systems in the biosensor-triggered multimedia communications session. In another example, Agency A 102 invites one or more other media resources in Agency B 106 to join the biosensor-triggered multimedia collaboration session to become an inter-agency biosensor-triggered multimedia collaboration session. Upon joining the incident collaboration session, interoperability workstations (IWSs) and media and/or communications resources in the respective Agency A 102 and Agency B 106 may have voice communications with field personnel 108 and also receive the video data electronically transmitted via the interoperability gateway device, from body-worn camera 154.

In an example, monitoring module 156 is programmed such that a deactivation message is triggered once the officer's heart rate drops below 80 beats per minute. Once monitoring module 156 receives biometric data (e.g., the heart rate) from body-worn biosensor 152 via PAN 150, and detects that the heart rate is below 80 beats per minute, monitoring module 156 electronically transmits the deactivation message via PAN 150 to body-worn camera 154 to cease recording and/or streaming video data. Monitoring module 156 also electronically transmits via the interoperability gateway device, a camera deactivated message via a wireless network connection over IP network 104, to Agency A 102 that is monitoring field personnel 108 (e.g., the officer). In this example, based on rules and the received camera deactivated message, Agency A 102 may deactivate the biosensor-triggered multimedia communications session.

System

Figure 2A:
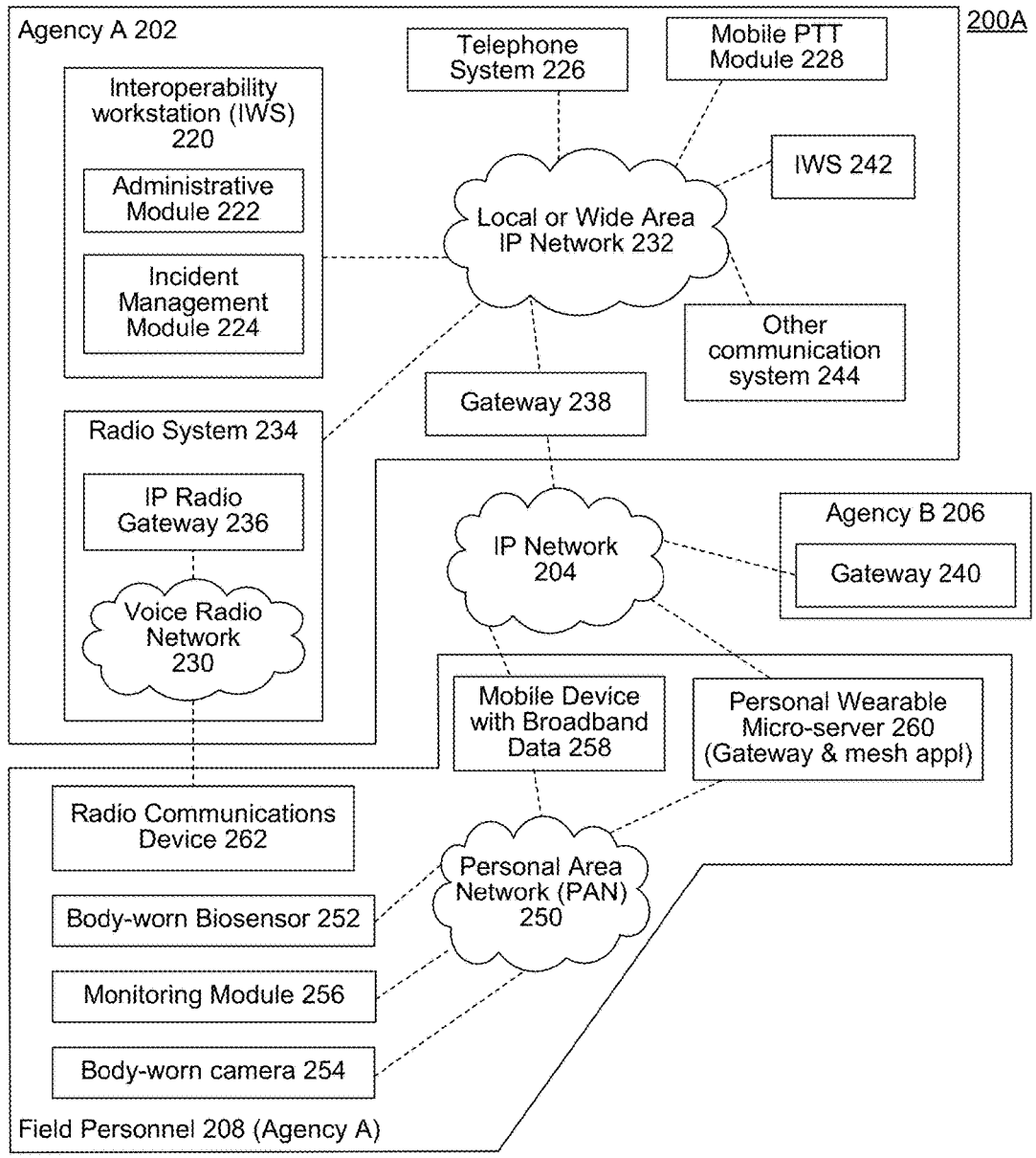
FIG. 2A illustrates a more detailed block diagram of a system according to an embodiment.

FIG. 2A illustrates a detailed block diagram of a system 200A according to an embodiment of the invention that includes Agency A 202, Agency B 206, field personnel 208, and Internet Protocol (IP) network 204. IP network 204 is substantially the same as IP network 104 of FIG. 1A.

Field Personnel 208

Field personnel 208 may carry and/or wear devices including but not limited to at least one of body-worn biosensor 252, monitoring module 256, body-worn camera 254, radio communications device 262, mobile device with broadband data 258, and personal wearable micro-server 260 that communicate via PAN 250.

Radio communications device. Radio communications device 262 may be a hand held or portable communication device that communicates with voice radio network 230.

Mobile device with broadband data. Mobile device with broadband data 258 may be a computing device with an operating system that may include but is not limited to, for example, the iOS platform produced by Apple Inc. of Cupertino, Calif., the Android platform produced by Google Inc. of Mountain View, Calif., the Windows platform produced by Microsoft Corp. of Redmond, Wash., the Blackberry platform produced by Blackberry Ltd. of Ontario, Calif., or the open-source Linux platform (e.g., a smart phone). Mobile device with broadband data 258 may include interoperability gateway functions that enable bridging and sharing of data from field personnel 208's devices in a biosensor-triggered multimedia collaboration session. For example, once a biosensor-triggered multimedia collaboration session is established, body-worn camera 254 may stream audio and video data through the interoperability gateway functions on mobile device with broadband data 258 to the biosensor-triggered multimedia collaboration session. Mobile device with broadband data 258 may be coupled to IP network 204 using 3G/4G LTE network protocols.

Personal area network (PAN). PAN 250 includes a wired and/or a wireless data communications link among devices in close proximity. For example, PAN 250 may include at least one of a wired interface including but not limited to a universal serial bus (USB), or a wireless interface including but not limited to: a Bluetooth, WiFi, Zigbee, or other wireless protocol.

Personal wearable micro-server 260. Personal wearable micro-server 260 may be a portable mesh capable radio transceiver device that includes interoperability gateway functions to connect with IP network 204 that enable bridging and hence sharing of data from field personnel 208's devices in a biosensor-triggered multimedia collaboration session. Personal wearable micro-server 260 is mesh capable, and thus includes and runs a mesh network software application to detect, form, and/or join a local ad hoc mesh network. In an embodiment, personal wearable micro-server 260 may include interoperability gateway functions and a mesh network software application to perform relay gateway functions described below in conjunction with FIG. 2B.

Body-worn biosensor. In an embodiment body-worn biosensor 252 may produce a biometric signal of at least one of: a respiration rate, a heart rate, a blood pressure, a perspiration rate, an oxygen level, a body temperature, a voltaic skin response, a bioelectric activity (e.g., EKG, EEG, neuronal probe data), an altitude, a pitch, a yaw, a rotation or other angular movement, a position, a force, a location, an acceleration, a deceleration, or a change in any of the above (e.g., a change in respiration rate, a change in an acceleration, or a change in a voltaic skin response). In an embodiment, field personnel 208 may also include body-worn or proximate environmental sensors that monitor environmental conditions such as an ambient temperature, a wind chill, a dew point, a radiation level, a chemical level, a biological agent, a sound, a pressure, a humidity level, a precipitation level, an air pollutant, a lightning strike, a terrain, an altitude, a location (e.g., from a global positioning system (GPS)), or an air quality level.

Body-worn camera. In an embodiment body-worn camera 254 may be activated and deactivated based on signals electronically received from monitoring module 256. A received signal may initiate audio and visual recording as well as the capture of still images that may be streamed, or stored and forwarded to a transceiver device with interoperability gateway functions (e.g., personal wearable micro-server 260 or mobile device with broadband data 258)

Monitoring module. In an embodiment, monitoring module 256 may infer field personnel 208's distress as well as a stressful situation, a performance level, a health risk, or a risk of harm from various biometric signals detected, measured, and output by one or more body-worn biosensors coupled to monitoring module 256. Monitoring module 256 may be a thin client software application operating on a local computing platform which is coupled to a remote server, computing device or application service which hosts a monitoring application software (e.g., Administrative module 222 of interoperability workstation (IWS) 220). For example, monitoring module 256 may operate on a body-worn computing platform (e.g., personal wearable micro-server 260), or on a mobile computing platform (e.g., mobile device with broadband data 258).

Monitoring module 256 interprets data from one or more sensors either singularly or in combination using factors including biosensor threshold values that indicate or infer a condition such as physical or psychological distress, a medical emergency, or a presence of a hazard.

In an embodiment, monitoring module 256 compares a biometric signal with a trigger threshold rule comprising at least one of: a criteria, a parameter, a static rule, or a dynamic rule to detect when the trigger threshold rule is exceeded. The trigger threshold rule may include but is not limited to at least one of: a change in a value over time, a rate of change of values over time, correlations with data from a different biosensor sensor, correlations with data from an environmental sensor, correlations with data from a GPS system, a health or a fitness condition of the user, a condition of other personnel being monitored in proximity to the user, a material rating, a system rating, or a system limit.

Monitoring module 256 also interprets output from environmental sensors. Examples of environmental signals include but are not limited to a chemical level, a radiation level, a biological agent, a sound, an ambient temperature, a pressure, a wind chill, a dew point, a humidity level, a precipitation level, an air pollutant level, a lightning strike, a terrain, an altitude, a location, an air quality level, or a change in any of the above (e.g., a change in a chemical level, a dew point, a precipitation level, or a number of lightning strikes).

When one or more conditions are satisfied or a trigger threshold rule is exceeded, monitoring module 256 detects an event and electronically transmits an activation message via PAN 250 to body-worn camera 254 and/or other cameras coupled to monitoring module 256 to initiate audio and visual recording and to transmit the recordings to a transceiver device with interoperability gateway functions (e.g., personal wearable micro-server 260 or mobile device with broadband data 258) which sends the data to one or more interoperable work stations.

In addition, monitoring module 256 electronically transmits an event alert message substantially at the same time to Agency A 202 via wireless means including interoperability gateway functions to incident management module 224 of IWS 220 (described below) to indicate that an event has been detected. The event alert message may include information including but not limited to the identity of the biosensor wearing personnel, the biosensor identification, the biosensor data received by monitoring module 256, transformed data derived or based on the biosensor data received (e.g., output from body-worn biosensor 252), the location of the subject wearing the body-worn biosensor, and other environmental or context information.

For example, an accelerometer may be body-worn biosensor 252 that records and electronically transmits information regarding an unusual acceleration of the personnel wearing the biosensor (field personnel 208) indicating a chase, or a deceleration indicating a sudden impact monitoring module 256. When the body-worn accelerometer electronically transmits information indicating a sudden deceleration coupled within an increase in the heart rate of field personnel 208 exceeding a normal level, monitoring module 256 may use algorithms (e.g., rules) to infer that an accident has occurred, or a sudden vehicle stop occurred followed by a foot chase or other strenuous physical activity, especially when coupled with location information such as a body-worn GPS unit. With location information over time, monitoring module 256 may use algorithms to infer whether field personnel 208 may be incapacitated by a lack of movement, or that a foot chase is occurring based on changing location information over time that shows movement at an extrapolated rate within a human running pace rate. Further, if biometric signals from the body-worn accelerometer shows further accelerating and decelerating movements, the monitoring module 256 may infer that a possible physical struggle or altercation is occurring.

Sample Rule. Below is an example of a trigger threshold rule.

IF Personnel 208's accelerometer exceeds −3.0 g at time t
AND IF Personnel 208's heart rate monitor values exceeds the value 120 bpm within 3 seconds prior or 60 seconds after time t, THEN send Event Alert message to interoperability workstation
WHERE the Event Alert message shall contain Wearer ID, Event ID Code and Latitude and Longitude.

The Event Alert message is electronically transmitted to the associated or designated IWS, IWS 220, by monitoring module 256 via a routing interoperability gateway coupled to the monitoring module 256 based upon rules which are programmed into monitoring module 256 or which are received from administrative module 222. The Event Alert message may also be electronically transmitted via a communications network (e.g., PAN 250) to one or more other computing clients such as smartphones (e.g., mobile device with broadband data 258) where the Event Alert message may be displayed through the computing client application GUI.

In an embodiment, monitoring module 256 may include rules and parameters or be coupled to an automated messaging module (not shown) which contains rules and parameters that electronically transmit advisory messages to the field personnel being monitored. An advisory message may be an audio and/or visual message that includes information such as warnings or status updates regarding body-worn biosensor 252 signals, other biosensor signals, and/or environmental sensor signals, including changes in sensor signals. Advisory messages may be based on the same parameters and rules as Event Alerts or use different threshold values. Advisory messages may be advisory and/or include a user action prompt. For example, an advisory message may indicate that an event alert condition is detected and an emergency incident will be reported unless field personnel 208 declines within a specified time frame, field personnel 208 may select to electronically transmit an event alert message. Field users may interact with monitoring module 256 via a GUI displayed on a local computing device, or through a voice interaction interface, or a gesture recognition interface.

Agency A 202

Agency A 202 includes an interoperability workstation (IWS) 220 as described in the '445 and '874 patents; IWS 220 controls the following resources: radio system 234, telephone system 226, and mobile PTT module 228. Agency A 202 also includes IWS 242 that controls other communication system 244 which may be a proprietary voice communication system. Gateway device 238 determines whether to grant a request to access Agency A 202 as described in the Enclaved Application. Local or Wide Area IP network 232 may be a wired and/or wireless network, and may be any combination of LANs, WANS, etc.

Radio system. Radio system 234 includes voice radio network 230 and IP radio gateway 236. Voice radio network 230 includes antennas and base consoles that utilize one or more communications channels including but not limited to Very High Frequency (VHF) and Ultra High Frequency (UHF). IP radio gateway 236 is equivalent to a radio network interface controller (RNIC) as described in the '445 and '874 patents. IP radio gateway 236 responds to commands from IWS 220 for coupling voice radio network 230 to a biosensor-triggered multimedia collaboration session, for example.

IWS. IWS 220 includes administrative module 222 and incident management module 224.

Administrative module. Administrative module 222 may include a software application running on a server or computing device coupled to IWS 220. Administrative module 222 may be coupled to an application database or an external database resource such as a directory. Administrative module 222 enables an operator or administrator to manage biosensors (e.g., body-worn biosensor 252) and/or environmental sensors, as well as to establish trigger threshold rules that include but are not limited to an established criteria, a parameter, a static rule, or a dynamic rule. The sensors are registered with administrative module 222 and are assigned a unique identification which may be based on but not limited to at least one unique identifier such as: a sensor machine address, a serial number, an encryption key, an electronic serial number, a telephone number, or an IP address. The sensor ID may be further associated with a unique identification of an individual wearing the sensor (e.g., body-worn biosensor 252) or an individual in proximity to the sensor, where the individual's unique identifier may include but is not limited to at least one of: a name, an agency name, a department ID, an employee ID number, an operator number, a team ID, a badge number, or a social security number. Administrative module 222 rules or parameters may be unique for each person or each sensor associated with a person, or may be the same for all persons or subset of persons wearing the same functional type of sensor. For example, field personnel 208 may be assigned a threshold parameter of 120 beats per minute for a heart rate monitor and field personnel 212 may be assigned a threshold parameter of 140 beats per minute for a heart rate monitor.

Administrative module 222 may be centrally provisioned at IWS 220 and then trigger threshold rules associated with field personnel 208 are electronically transmitted and stored by monitoring module 256. Alternatively, trigger threshold rules may be provisioned by the person associated with or wearing the monitored sensor. For example, field personnel 208 may set trigger threshold rules through a GUI of monitoring module 256. In an embodiment, trigger threshold rules include a combination of rules provisioned centrally by IWS 220 and rules provisioned by field personnel 208 associated with the sensor.

Administrative module 222 may be coupled with one or more directories and databases of other systems and software applications (not shown) which contain, maintain, and update user identification, communications and media asset identification, routing, addressing and other information. Administrative module 222 may utilize data in the one or more directories singly or in combination, and may transform and store data in an administrative module directory or database (not shown).

Incident management module. Incident management module 224 may be a part of or coupled to administrative module 222, and may include a software application running on a server or computing device coupled to IWS 220. When incident management module 224 receives and processes event alert messages from monitor module 256, incident management module 224 initiates a biosensor-triggered multimedia collaboration with one or more designated IWSs, bridges resources, and may invite resources from one or more partner agencies to join the biosensor-triggered multimedia collaboration session, or may exclude a partner agency from the biosensor-triggered multimedia collaboration session.

Agency B 206

Agency B 206 may include similar functionality as described in Agency A.

Method

Figure 3A:
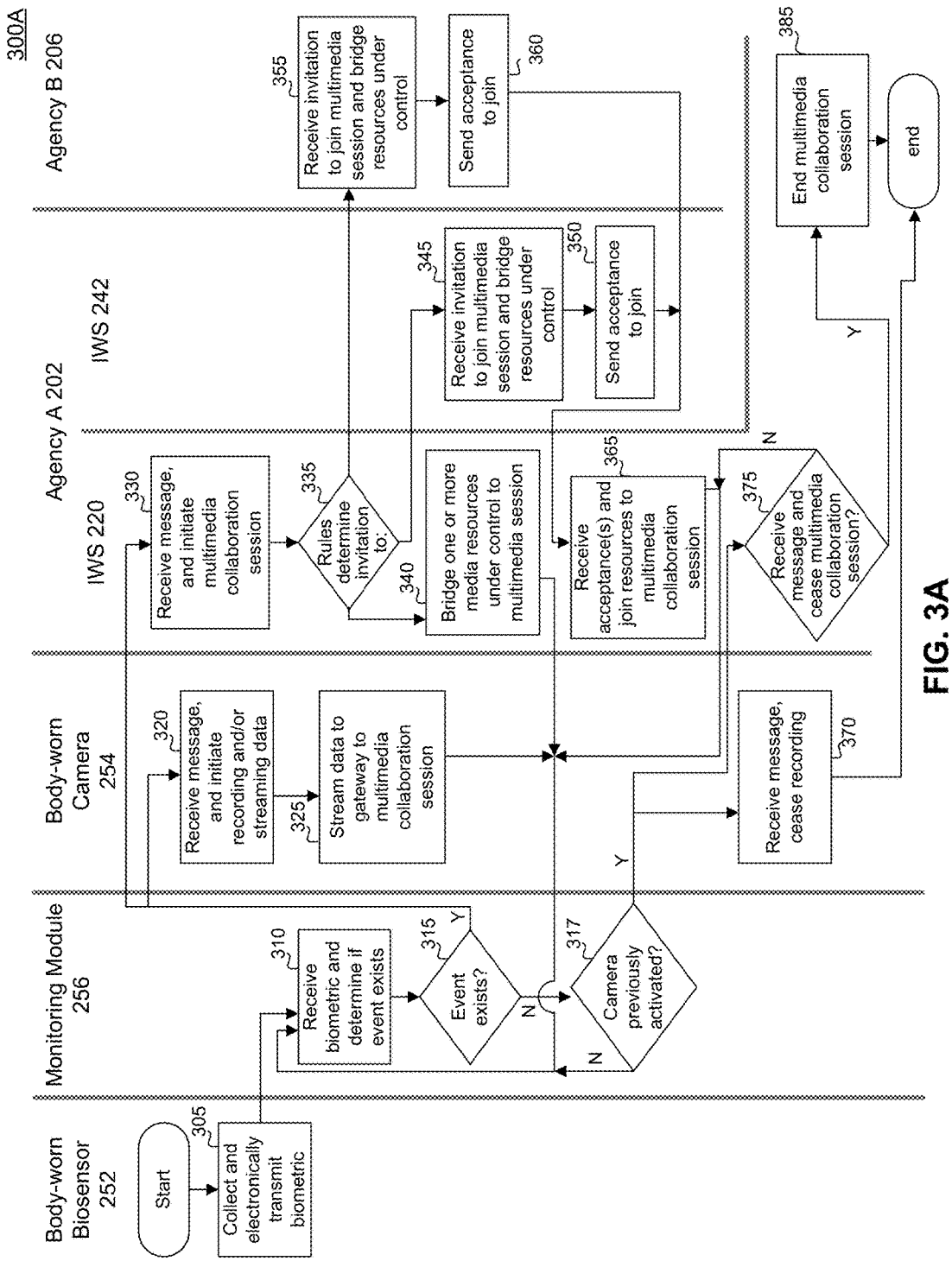
FIG. 3A is a flow chart of a method for biosensor-triggered multimedia collaboration according to an embodiment.

FIG. 3A is a flow chart of a method 300A for biosensor-triggered multimedia collaboration according to an embodiment. For ease of discussion and without limitation, FIG. 3A will be described with reference to elements from FIG. 1A and FIG. 2A.

Method 300A begins and at step 305. At step 305, body-worn biosensor 252 collects and electronically transmits biometric output to monitoring module 256. Method 300A proceeds to step 310.

At step 310, monitoring module 256 receives the biometric output signals and determines if an event has occurred. Method 300A proceeds to step 315.

At step 315, a determination is made whether an event was detected (e.g., recently from step 310 or previously detected and still exists). When an event is detected, method 300A proceeds to step 320 and step 330 at substantially the same time. When an event is not detected, method 300A proceeds to step 317.

At step 320, body-worn camera 254 electronically receives a control message from monitoring module 256, and begins recording and/or streaming data. Method 300A proceeds to step 325.

At step 325, body-worn camera 254 streams data via PAN 250 through a interoperability gateway function to bridge the streamed data to the biosensor-triggered multimedia collaboration session. As shown in FIG. 2A, mobile device with broadband data 258 and personal wearable microserver 260 may include the interoperability gateway function. Method 300A returns to step 310.

Returning to step 330, IWS 220 receives an event alert message from monitoring module 256 and initiates a biosensor-triggered multimedia collaboration session. For example, incident management module 224 of IWS 220 initiates a biosensor-triggered multimedia collaboration session by electronically transmitting a command message to one or more designated IWSs. The '445 and '874 patents described initiating an interoperable network or an incident communications network, and the Marshalling Patent describes systems and methods to marshal resources into an incident communications network based on a variety of factors, such as the type of incident and the type of resource being marshaled. Method 300A proceeds to step 335.

At step 335 a determination is made based on predetermined static rules or dynamic rules whether IWS 220, IWS 242, or Agency B 206 has media and/or communications resources to bridge to the biosensor-triggered multimedia collaboration session. Method 300A proceeds to step 340 when IWS 220 has resources to bridge. Method 300A proceeds to step 345 when IWS 242 has resources to bridge. And, method 300A proceeds to step 355 when Agency B has media and/or communications resources to bridge. When IWS 220 has resources to bridge, method 300A proceeds to step 340.

At step 340, IWS 220 bridges one or more media and/or communications resources that IWS 220 controls to the biosensor-triggered multimedia collaboration session. For example, at substantially the same time or after the biosensor-triggered multimedia collaboration session is initiated, incident management module 224 of IWS 220 electronically transmits one or more command messages to couple or bridge certain communications and media resources under control of IWS 220 to the biosensor-triggered multimedia collaboration session. These communications and media resources automatically include body-worn camera 254 of field personnel 208 from which the event alert message originated, radio communications device 262, mobile device with broadband data 258 (e.g., smartphone PPT talk group or emergency voice channel). Once bridged, multiple personnel, invited to the biosensor-triggered multimedia collaboration session may both view the video data streamed from body-worn camera 254 and have real time voice communications with field personnel 208. For example, other personnel of Agency A 202 invited to the biosensor-triggered multimedia collaboration session using radio system 234 for voice communications may view the video data streamed from body-worn camera 254 on a GUI of IWS 220 and speak to field personnel 208 via their radio communications device.

Other media and/or communications resources may be bridged via pre-determined assignment or dynamic determination. The Marshalling Patent describes methods for marshaling resources into an incident communications network. In this application, dynamic determinations are based upon dynamic rules within incident management module 224 using various known or accessible parameters to determine the relevancy of assets to be included in the biosensor-triggered multimedia collaboration session. These parameters may include but are not limited to: resources that are in geographic proximity to the subject from which the event alert message originated (e.g., a body-worn camera worn by field personnel 212 in proximity to field personnel 208), the identity of the subject associated with a wearable sensor, or various assets associated with the subject including but not limited to: a unique user ID associated with a Push to Talk Client operating on a mobile phone, a radio unit identifier associated with the subject, or a telephone number associated with the subject. Additional parameters may include other media and/or communication resources including but not limited to radios, mobile phones, telephones, video cameras and information systems and/or services that are based on criteria including but not limited to relevant departments, working groups, task groups, divisions, functions, expertise, skills, credentials, or positions. For example, a dynamic rule may result in a body-worn camera and a radio communications device of other field personnel in proximity to field personnel 208, being bridged into the biosensor-triggered multimedia collaboration session. Method 300A returns to step 310.

Returning to step 345, IWS 242 receives an invitation from IWS 220 to join the biosensor-triggered multimedia collaboration session. IWS 242 determines whether to join and bridge resources that IWS 242 controls to the session. Method 300A proceeds to step 350.

At step 350, IWS 242 electronically transmits an acceptance to join and may bridge other communication system 244 to the biosensor-triggered multimedia collaboration session after joining the session. Method 300A proceeds to step 365.

At step 365, IWS 220 receives the acceptance from IWS 242 and adds IWS 242 to the biosensor-triggered multimedia collaboration session. Method 300A returns to step 310.

Returning to step 355, Agency B 206 receives an invitation to join the biosensor-triggered multimedia collaboration session from IWS 220. For example, at substantially the same time or after the initiation of the biosensor-triggered multimedia collaboration session, incident management module 224 electronically transmits command messages to invite IWSs from other partner agencies (e.g., Agency B 206) with whom secure communications have been established. An example of dynamic access among secure communities is described in the Enclaved Application. The invitation may be automatically transmitted. In an embodiment, the invitation may be presented in the form of a visual suggestion on a GUI of IWS 220, coupled with a user selectable item to selectively invite the suggested agency resource or alternatively, to selectively exclude a suggested agency resource. Agency B 206 determines whether to join and bridge resources that Agency B 206 controls to the session. Once bridged, multiple personnel, from Agencies A 202 and B 206 invited to the biosensor-triggered multimedia collaboration session may both view the video data streamed from body-worn camera 254 and have real time voice communications with field personnel 208. Method 300A proceeds to step 360.

At step 360, Agency B 206 electronically transmits an acceptance to join and may bridge the resources that Agency B 206 controls after joining the session. Method 300A returns to step 365.

Returning to step 315, when monitoring module 256 determines that an event is not detected, method 300A proceeds to step 317.

At step 317, a determination is made whether body-worn camera 254 was previously activated (e.g., body-worn camera 254 is recording). When body-worn camera 254 was not previously activated, method 300A returns to step 310. When body-worn camera 254 was previously activated, monitoring module 256 electronically transmits a control message via PAN 250 to body-worn camera 254 to stop recording. In addition, monitoring module 256 electronically transmits an event-ended message to IWS 220 at substantially the same time. Method 300A proceeds to step 370 and step 375.

At step 370, body-worn camera 254 receives the control message and stops recording data. Method 300A ends.

Proceeding to step 375, IWS 220 electronically receives the event-ended message and determines based on static and/or dynamic rules whether to cease the biosensor-triggered multimedia collaboration session. When IWS 220 determines to continue the biosensor-triggered multimedia collaboration session (e.g., not to cease the session), method 300A returns to step 310. For example, more than one event alert may have been received and more than one body-worn camera is active. When body-worn camera 254 stops recording, other body-worn cameras, media devices, and/or communications devices may be actively engaged in the biosensor-triggered multimedia collaboration session. When IWS 220 has not received an event-ended message associated with each event alert, method 300B returns to step 310. When IWS 220 determines to end the biosensor-triggered multimedia collaboration session, method 300A proceeds to step 385.

At step 385, IWS 220 ends the biosensor-triggered multimedia collaboration session and method 300A ends.

Networked Personal Wearable Micro-servers & Relay Gateway Systems

Figure 1B:
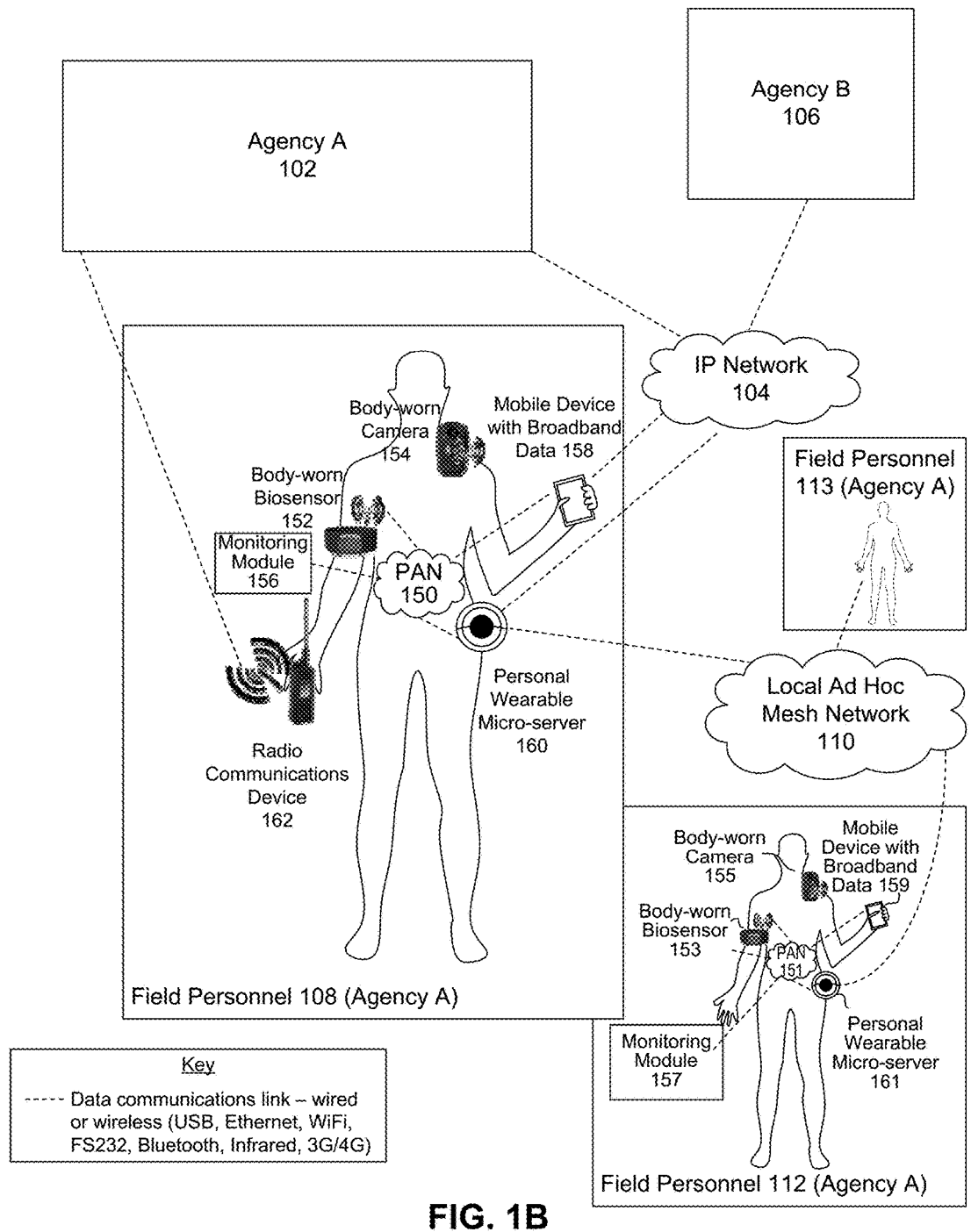
FIG. 1B illustrates a diagram of a system with networked personal wearable micro-servers according to an embodiment.

In an embodiment, a personal wearable micro-server may be connected or networked with one or more personal wearable micro-servers. FIG. 1B illustrates a diagram of a system 100B with networked personal wearable micro-servers according to an embodiment. System 100B includes the elements of system 100A of FIG. 1A and the following additional elements: local ad hoc mesh network 110, field personnel 112, and field personnel 113, both of which are associated with Agency A that are similarly equipped as field personnel 108. For example, body-worn biosensor 153, body-worn camera 155, monitoring module 157, mobile device with broadband data 159, and PAN 151 of field personnel 112 are equivalent to the functions of body-worn biosensor 152, body-worn camera 154, monitoring module 156, mobile device with broadband data 158, and PAN 150 of field personnel 108. Although not shown, field personnel 113 includes elements similar to field personnel 112.

In an example, field personnel 108, 112, and 113 may communicate among themselves via networked personal wearable micro-servers that form a local ad hoc infrastructure such as local ad hoc mesh network 110. Field personnel 108, 112 and 113 may be coupled to local ad hoc mesh network 110 via a personal wearable micro-server 160 or 161 running a mesh network software application (e.g., 160 and 161 are mesh-capable). For example, field personnel 108, 112, and 113 may be first responders that enter a building that has minimal or no wireless access infrastructure. Field personnel 108, 112, and 113 may communicate among themselves with respective mobile devices with broadband data 158 and 159 utilizing the radio transceiver functions of mesh-capable personal wearable micro-server 160 or 161 over local ad hoc mesh network 110.

In an embodiment, a mesh-capable personal wearable micro-server that also has interoperability gateway functions may serve as a relay gateway for one or more mesh-capable personal wearable micro-servers that are coupled to a local ad hoc mesh network and do not have interoperability gateway functions. For example, personal wearable micro-server 160 may be a relay gateway for personal wearable micro-servers 161 coupled to local ad hoc mesh network 110 so that field personnel 112 and 113 (that would otherwise not have access to a wide area data communications network, e.g., IP network 104) may communicate with Agency A 102 or other parties over IP network 104 via personal wearable micro-server 160, a relay gateway that transmits communications accordingly. In an example, field personnel 108, 112, and 113 may enter a building that has minimal or no wireless access infrastructure, and communicate among themselves and Agency A 102 with respective mobile devices (e.g., mobile devices with broadband data 158 and 159). For example, a communication from field personnel 112 to Agency A 102 may traverse from mobile device with broadband data 159, PAN 151, personal wearable microserver 161, local ad hoc mesh network 110, personal wearable micro-server 160, and IP network 104 to reach Agency A 102.

In an embodiment, when two or more personal wearable micro-servers are networked and one of the two or more personal wearable micro-servers is a relay gateway, a device associated with the relay gateway may perform analogous functions for a failed device associated with a personal wearable micro-server of the two or more networked personal wearable micro-servers. For example, personal wearable micro-server 160 and personal wearable micro-server 161 may be networked via local ad hoc mesh network 110, and a relay gateway (e.g., personal wearable micro-server 160) is established. If monitoring module 157 of field personnel 112 fails based on certain parameters (e.g., an application fails or the device on which monitoring module 157 resides has a low power source condition or fails), monitoring module 156 associated with the relay gateway (e.g., personal wearable micro-server 160) may provide the monitoring module functions formerly provided by monitoring module 157, for field personnel 112.

Figure 2B:
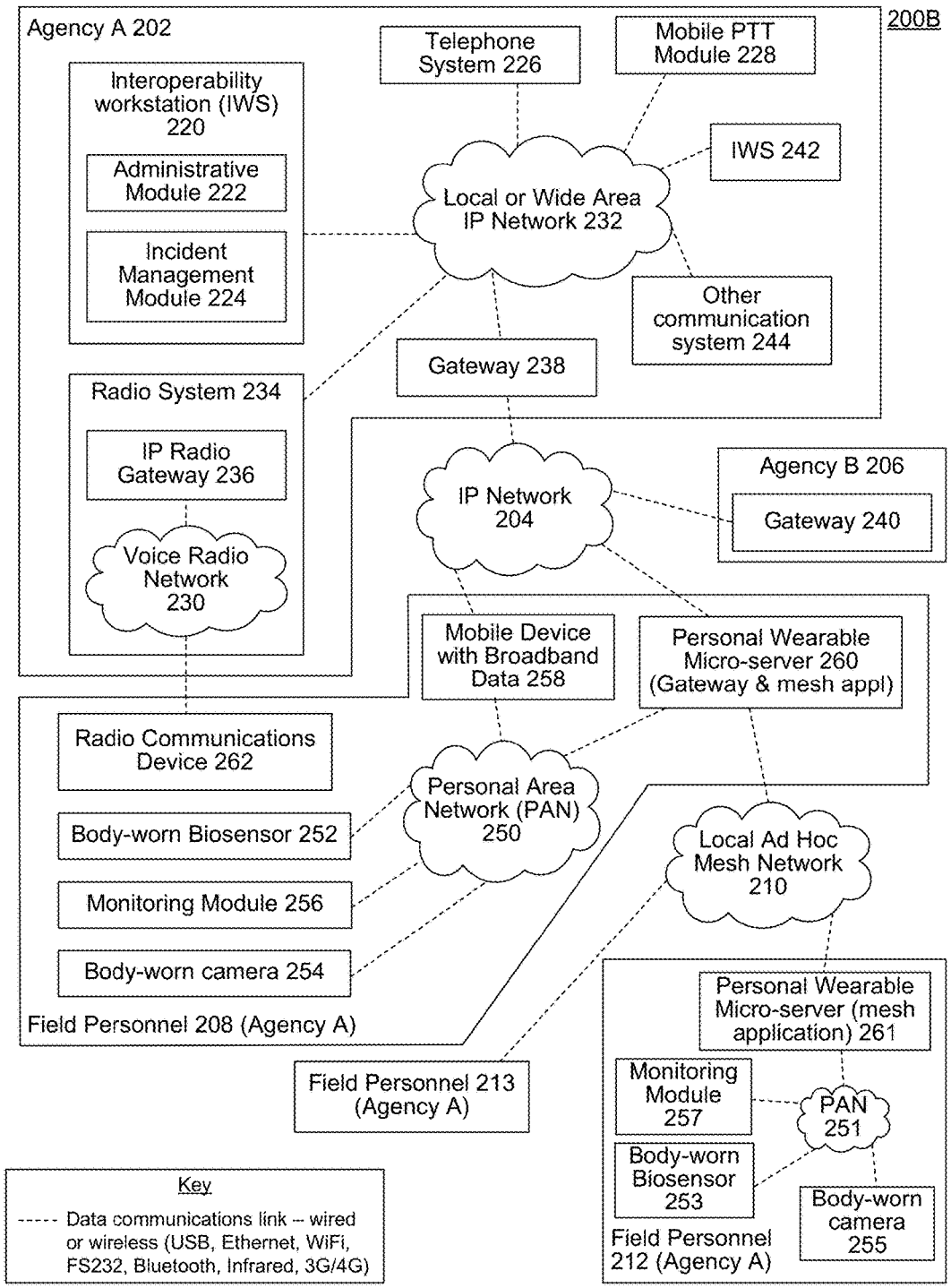
FIG. 2B illustrates a more detailed block diagram of a system with networked personal wearable micro-servers according to an embodiment.

FIG. 2B illustrates a more detailed block diagram of a system 200B with networked personal wearable micro-servers according to an embodiment of the invention. System 200B includes the elements of system 200A of FIG. 2A and the following additional elements: local ad hoc mesh network 210, field personnel 212, and field personnel 213 that correspond with the elements of FIG. 1B: local ad hoc mesh network 110, field personnel 112, and field personnel 113. In an example, field personnel 212 (and 213) are substantially similar to field personnel 208, but without necessarily having their own interoperability gateway functions (e.g., no direct access to IP network 204).

Personal wearable micro-server device without interoperability gateway function. In an embodiment, field personnel 212 includes personal wearable micro-server device 261 that includes a mesh network software application and radio transceiver functions. Personal wearable micro-server device 261 is a portable mesh-capable radio transceiver device capable of detecting other portable mesh-capable radio transceiver devices, as well as detecting, forming, and/or joining a local ad hoc mesh network coupled to other personal wearable micro-server devices running a mesh network software application (e.g., personal wearable micro-server 260 or a personal wearable micro-server 261 of field personnel 213 that is not shown). However, personal wearable micro-server device 261 may not have interoperability gateway functions to access a wide area network (e.g., IP network 204).

Body-worn biosensor 253, body-worn camera 255, monitoring module 257, and PAN 251 of field personnel 212, are equivalent to the functions of body-worn biosensor 252, body-worn camera 254, monitoring module 256, and PAN 250 of field personnel 208.

Local ad hoc mesh network. Local ad hoc mesh network 210 is an infrastructure network that uses but is not limited to at least one of a Wi-Fi, Bluetooth or other wireless communication protocol to couple a personal wearable micro-server (e.g., personal wearable micro-server 260) to another personal wearable micro-server (e.g., personal wearable micro-server 261).

Relay gateway system. Personal wearable micro-server 260 is a portable mesh-capable personal wearable micro-server that also has interoperability gateway functions. Personal wearable micro-server 260 may serve as a relay gateway for one or more mesh-capable personal wearable micro-servers that are coupled to a local ad hoc mesh network and do not have interoperability gateway functions (e.g., personal wearable micro-server 161).

Relay Gateway Method

Figure 4:
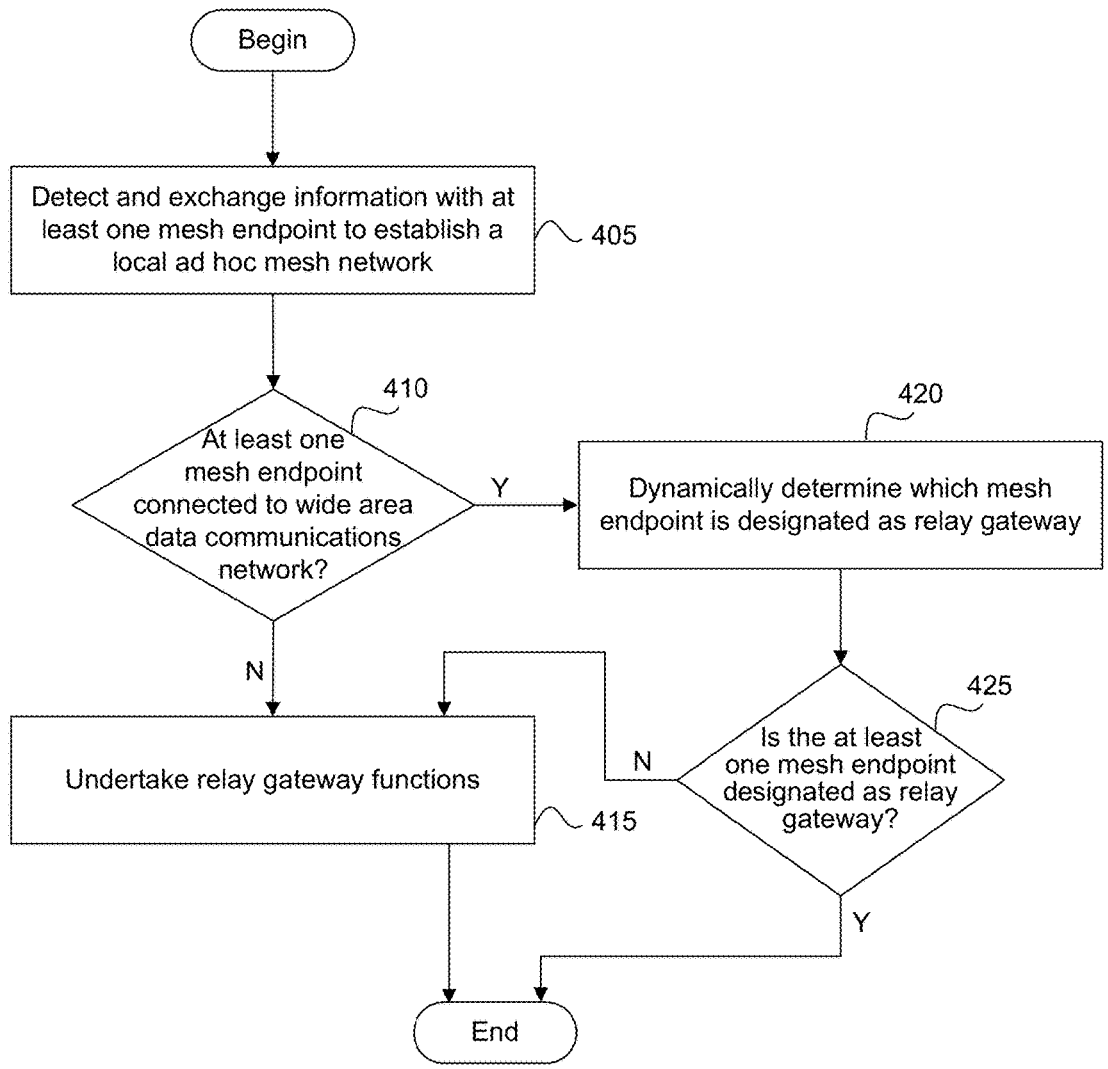
FIG. 4 is a flow chart of a method for a relay gateway according to an embodiment.

FIG. 4 is a flow chart of a method 400 for a relay gateway according to an embodiment. For ease of discussion and without limitation, FIG. 4 will be described with reference to elements from FIG. 1B and FIG. 2B. For example, method 400 describes a method for a relay gateway system (e.g., personal wearable micro-server 260), a portable mesh-capable radio transceiver (e.g., a mesh endpoint) with interoperability gateway functions running a mesh network software application to establish a local ad hoc network infrastructure (e.g., local ad hoc mesh network 210) with other personal wearable micro-servers (e.g., personal wearable micro-server 261). The relay gateway system (e.g., personal wearable micro-server 260) and/or other personal wearable micro-servers may be coupled to a PAN.

Method 400 begins. At step 405. Method 400 detects at least one other mesh endpoint that is also running a mesh network software application (e.g., personal wearable micro-server 260 and/or 261) that may be coupled to a respective different PAN, and exchanges information with the at least one mesh endpoint to establish a local ad hoc infrastructure network (e.g., local ad hoc mesh network 210). Although not shown, field personnel 213 may include a mesh endpoint such as personal wearable micro-server 261 or personal wearable micro-server 260, and may be coupled to a PAN similar to field personnel 212 or 208. Method 400 proceeds to step 410.

At step 410, a determination is made whether the at least one mesh endpoint has connectivity to a wide area network (e.g., IP Network 204) which may be coupled to an administrative module (e.g., administrative module 222). If the at least one mesh endpoint does not have connectivity to a wide area network, then method 400 proceeds to step 415. If the at least one mesh endpoint has connectivity to a wide area network, then method 400 proceeds to step 420.

At step 415, method 400 designates the relay gateway system (e.g., personal wearable micro-server 260) to perform relay gateway functions for the at least one mesh endpoint (e.g., personal wearable micro-server 261) coupled to the local ad hoc infrastructure network (e.g., local ad hoc mesh network 210). For example, personal wearable micro-server 260 electronically transmits communications from personal wearable micro-server 261 coupled to local ad hoc mesh network 210, to a destination via IP network 204. Method 400 ends.

Returning to step 420, a relay gateway system (e.g., personal wearable micro-server 260), exchanges administrative messages with the at least one mesh endpoint with connectivity to a wide area network (e.g., a different relay gateway system not shown) and dynamically determines which is designated to perform the relay gateway functions for the networked personal wearable micro-servers. For example, field personnel 213 may also have a relay gateway system equivalent to personal wearable micro-server 260. In an embodiment, the dynamic determination may be based on but is not limited to at least one of a signal strength, a processor speed, a bandwidth throughput, a relative number of transmission links to peers, or a battery power of the at least one mesh endpoint. Method 400 proceeds to step 425.

At step 425, a determination is made whether the at least one mesh endpoint with connectivity to a wide area network (e.g., the different relay gateway system) is designated as the relay gateway for the networked personal wearable micro-servers. When the at least one mesh end point with connectivity to a wide area network is not designated as the relay gateway, method 400 proceeds to step 415 as described above. When the at least one mesh endpoint with connectivity to a wide area network is designated as the relay gateway, method 400 stores the at least one mesh endpoint with connectivity to a wide area network information accordingly and method 400 ends.

Once the relay gateway (e.g., personal wearable micro-server 260) and the local ad hoc infrastructure network (e.g., local ad hoc mesh network 210) are established, a device associated with the relay gateway may perform analogous functions for a failed device associated with a personal wearable micro-server coupled to the local ad hoc infrastructure network. For example, monitoring module 256 associated with relay gateway personal wearable micro-server 260 may be configured to perform monitoring module 257 functions associated with personal wearable micro-server 261. For example, when monitoring module 257 fails, administrative module 222 may electronically receive a notification. Administrative module 222 may electronically transmit at least one of the trigger threshold rules or administrative information of the devices (e.g., body-worn biosensor 253, body-worn camera 255) associated with failed monitoring module 257 to monitoring module 256. Thus, signals from body-worn biosensor 253 may be electronically transmitted over PAN 251 to personal wearable micro-server 261, over local ad hoc mesh network 210 to personal wearable micro-server 260, and to monitoring module 256 via PAN 250. Monitoring module 256 receives the biometric signals and determines if an event exists. Monitoring module 256 may also receive environmental signals from field personnel 212 and determine based on rules whether a combination of biometric signals and environmental signals determines if an event exists. Many other combinations are possible. If an event is determined to exist, monitoring module 256 may electronically transmit a signal to activate body-worn camera 255 and a signal to Agency A 202 to initiate a biosensor-triggered multimedia collaboration session to be shared with field personnel 208, or join an existing biosensor-triggered multimedia collaboration session already established by monitoring module 256. In an embodiment, monitoring module 256 electronically transmits a signal to Agency A 202 to establish a second biosensor-triggered multimedia collaboration session different than one associated with field personnel 208.

Networked Personal Wearable Micro-servers Method

Figure 3B:
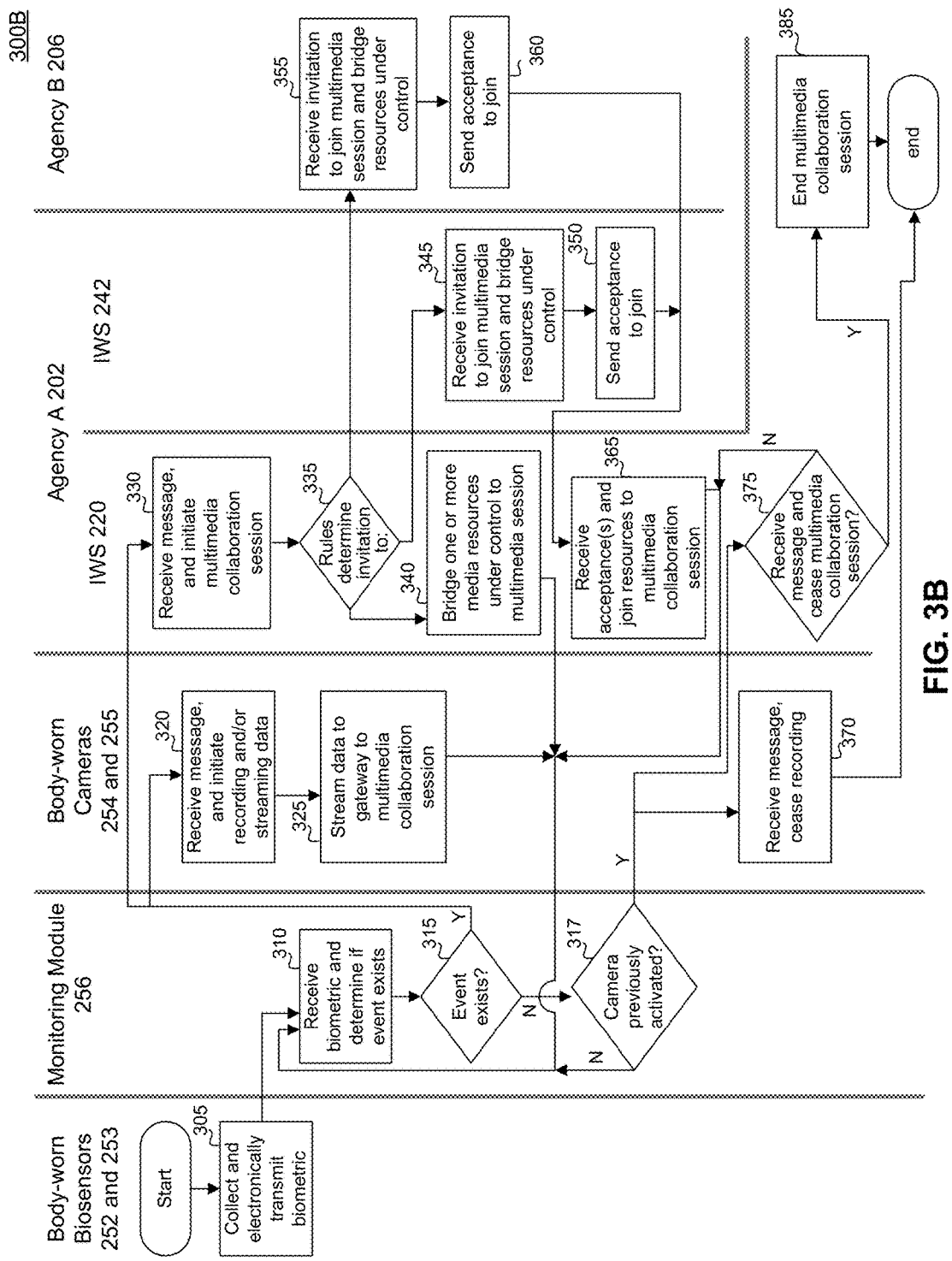
FIG. 3B is a flow chart of a method for biosensor-triggered multimedia collaboration with networked personal wearable micro-servers according to an embodiment.

FIG. 3B is a flow chart of a method 300B for biosensor-triggered multimedia collaboration with networked personal wearable micro-servers according to an embodiment. In this example, monitoring module 256 is configured to also perform the functions of a failed monitoring module 257. For ease of discussion and without limitation, FIG. 3B will be described with reference to elements from FIG. 1B and FIG. 2B. Method 300B is similar to method 300A described in FIG. 3A, and also includes body-worn biosensor 253 and body-worn camera 255 of field personnel 212.

Method 300B begins and at step 305. At step 305, body-worn biosensors 252 and 253 collect and electronically transmit biometric output to monitoring module 256. Method 300B proceeds to step 310.

At step 310, monitoring module 256 receives the biometric output signals and determines if an event has occurred. Monitoring module 256 may also receive environmental measurements or signals from field personnel 212. Method 300B proceeds to step 315.

At step 315, a determination is made whether an event was detected (e.g., recently from step 310 or previously detected and still exists). When an event was detected, method 300B proceeds to step 320 and step 330 at substantially the same time. When an event was not detected, method 300B proceeds to step 317.

At step 320, body-worn camera 254 and/or body-worn camera 255 electronically receive a control message from monitoring module 256, and begin recording and/or streaming data. Method 300B proceeds to step 325.

At step 325, body-worn camera 254 streams data via PAN 250 through a interoperability gateway function to bridge the streamed data to the biosensor-triggered multimedia collaboration session. As shown in FIG. 2B, mobile device with broadband data 258 and personal wearable micro-server 260 may include the interoperability gateway function. Method 300B returns to step 310. When activated, body-worn camera 255 streams data via PAN 251 to personal wearable micro-server 261, over local ad hoc mesh network 210 to personal wearable micro-server 260, to the biosensor-triggered multimedia collaboration session shared with field personnel 208 or a second biosensor-triggered multimedia collaboration session that is established.

Returning to step 330, IWS 220 receives an event alert message from monitoring module 256 and initiates a biosensor-triggered multimedia collaboration session. For example, incident management module 224 of IWS 220 initiates a biosensor-triggered multimedia collaboration session by electronically transmitting a command message to one or more designated IWSs. Method 300B proceeds to step 335. In an embodiment, IWS 220 receives an event alert message from monitoring module 256 and enables the video data streamed from body-worn camera 255 to join the established biosensor-triggered multimedia collaboration session. In an embodiment, IWS 220 receives an event alert message from monitoring module 256 and establishes a second biosensor-triggered multimedia collaboration session that would include the video data streamed from body-worn camera 255. In an example, the video data streamed from body-worn camera 255 may be included in one or more biosensor-triggered multimedia collaboration sessions.

At step 335 a determination is made based on predetermined static rules or dynamic rules (that may include information regarding field personnel 208 and/or 212) whether IWS 220, IWS 242, or Agency B 206 has media and/or communications resources to bridge to the biosensor-triggered multimedia collaboration session. Method 300B proceeds to step 340 when IWS 220 has resources to bridge. Method 300B proceeds to step 345 when IWS 242 has resources to bridge. And, method 300B proceeds to step 355 when Agency B has media and/or communications resources to bridge. When IWS 220 has resources to bridge, method 300B proceeds to step 340.

At step 340, IWS 220 bridges one or more media and/or communications resources that IWS 220 controls to the biosensor-triggered multimedia collaboration session. For example, at substantially the same time or after the biosensor-triggered multimedia collaboration session is initiated, incident management module 224 of IWS 220 electronically transmits one or more command messages to couple or bridge certain communications and media resources under control of IWS 220 to the biosensor-triggered multimedia collaboration session. These communications and media resources automatically include body-worn camera 254 of field personnel 208 and/or body-worn camera 255 of field personnel 212 from which the event alert message(s) originated, radio communications device 262 and/or equivalent device for field personnel 212, mobile device with broadband data 258 (e.g., smartphone PPT talk group or emergency voice channel) and/or equivalent device for field personnel 212. Once bridged, multiple personnel, invited to the automatically-triggered communications session may both view the video data streamed from body-worn camera 254 and/or body-worn camera 255 and have real time voice communications with field personnel 208 and/or field personnel 212 from which the event alert message(s) originated. For example, personnel using radio system 234 for voice communications may view the video data streamed from body-worn camera 254 on a GUI of IWS 220 and speak to field personnel 208 via their radio communications device. The same would also apply to equivalent devices associated field personnel 212.

Other media and/or communications resources may be bridged via pre-determined assignment or dynamic determination. For example, a dynamic rule may result in a body-worn camera and a radio communications device of other field personnel in proximity to field personnel 208, being bridged into the biosensor-triggered multimedia collaboration session. Method 300B returns to step 310.

Returning to step 345, IWS 242 receives an invitation from IWS 220 to join the biosensor-triggered multimedia collaboration session. IWS 242 determines whether to join and bridge resources that IWS 242 controls to the session. Method 300B proceeds to step 350.

At step 350, IWS 242 electronically transmits an acceptance to join and may bridge other communication system 244 to the biosensor-triggered multimedia collaboration session after joining the session. IWS 242 may decline the invitation and method 400 ends. Method 300B proceeds to step 365.

At step 365, IWS 220 receives the acceptance from IWS 242 (and/or Agency B 206) and adds IWS 242 (and/or Agency B 206) to the biosensor-triggered multimedia collaboration session. Method 300B returns to step 310.

Returning to step 355, Agency B 206 receives an invitation to join the biosensor-triggered multimedia collaboration session from IWS 220. For example, at substantially the same time or after the initiation of the biosensor-triggered multimedia collaboration session, incident management module 224 electronically transmits command messages to invite IWSs from other partner agencies (e.g., Agency B 206) with whom secure communications have been established. An example of dynamic access among secure communities is described in the Enclaved Application. The invitation may be automatically transmitted. In an embodiment, the invitation may be presented in the form of a visual suggestion on a GUI of IWS 220, coupled with a user selectable item to selectively invite the suggested agency resource or alternatively, to selectively exclude a suggested agency resource. Agency B 206 determines whether to join and bridge resources that Agency B 206 controls to the session. Once bridged, multiple personnel, from Agencies A 202 and B 206 invited to the automatically-triggered communications session may both view the video data streamed from body-worn camera 254 and/or body-worn camera 255, and have real time voice communications with field personnel 208 and/or field personnel 212 associated with originated event alert message(s). Method 300B proceeds to step 360.

At step 360, Agency B 206 electronically transmits an acceptance to join and may bridge the resources that Agency B 206 controls after joining the session. Method 300B returns to step 365.

Returning to step 315, when monitoring module 256 determines that an event is not detected, method 300B proceeds to step 317.

At step 317, a determination is made whether body-worn camera 254 (and/or body-worn camera 255) were previously activated (e.g., body-worn camera 254 and/or body-worn camera 255 are recording). When body-worn camera 254 (and/or body-worn camera 255) were not previously activated, method 300B returns to step 310. When body-worn camera 254 (and/or body-worn camera 255) were previously activated, monitoring module 256 electronically transmits a control message via PAN 250 (and/or PAN 251) to body-worn camera 254 (and/or body-worn camera 255) to stop recording. In addition, monitoring module 256 electronically transmits an event-ended message to IWS 220 at substantially the same time. Method 300B proceeds to step 370 and step 375.

At step 370, body-worn camera 254 (and/or body-worn camera 255) receives the control message and stops recording data. Method 300B ends.

Proceeding to step 375, IWS 220 electronically receives the event-ended message and determines based on static and/or dynamic rules whether to cease the biosensor-triggered multimedia collaboration session. When IWS 220 determines to continue the biosensor-triggered multimedia collaboration session, method 300B returns to step 310. For example, more than one event alert may have been received and more than one body-worn camera is active. When body-worn camera 254 stops recording, other body-worn cameras (e.g., body-worn camera 255), media devices, and/or communications devices may be actively engaged in the biosensor-triggered multimedia collaboration session. When IWS 220 has not received an event-ended message associated with each event alert, method 300B returns to step 310. When IWS 220 has electronically received an event-ended message associated with each event alert, method 300 B proceeds to step 385.

At step 385, IWS 220 ends the biosensor-triggered multimedia collaboration session and method 300B ends.

Mobile Ad-hoc Radio Based Linked Extensible (MARBLE) System

For any PAN, device, or subject having a radio based communication device capable of send or receiving data, there may exist one or more portable mesh-capable radio transceiver devices that may be distributed in the field by an operator in the form of a ball, puck or other shaped enclosure that may be held by a human hand and thrown, tossed or placed in the field (e.g., a MARBLE unit or system). A MARBLE unit may be worn (e.g., in a pocket) and perform the functions of personal wearable micro-server 261. A MARBLE unit may also include interoperability gateway functions and perform the functions of personal wearable micro-server 260 as described above.

Figure 5:
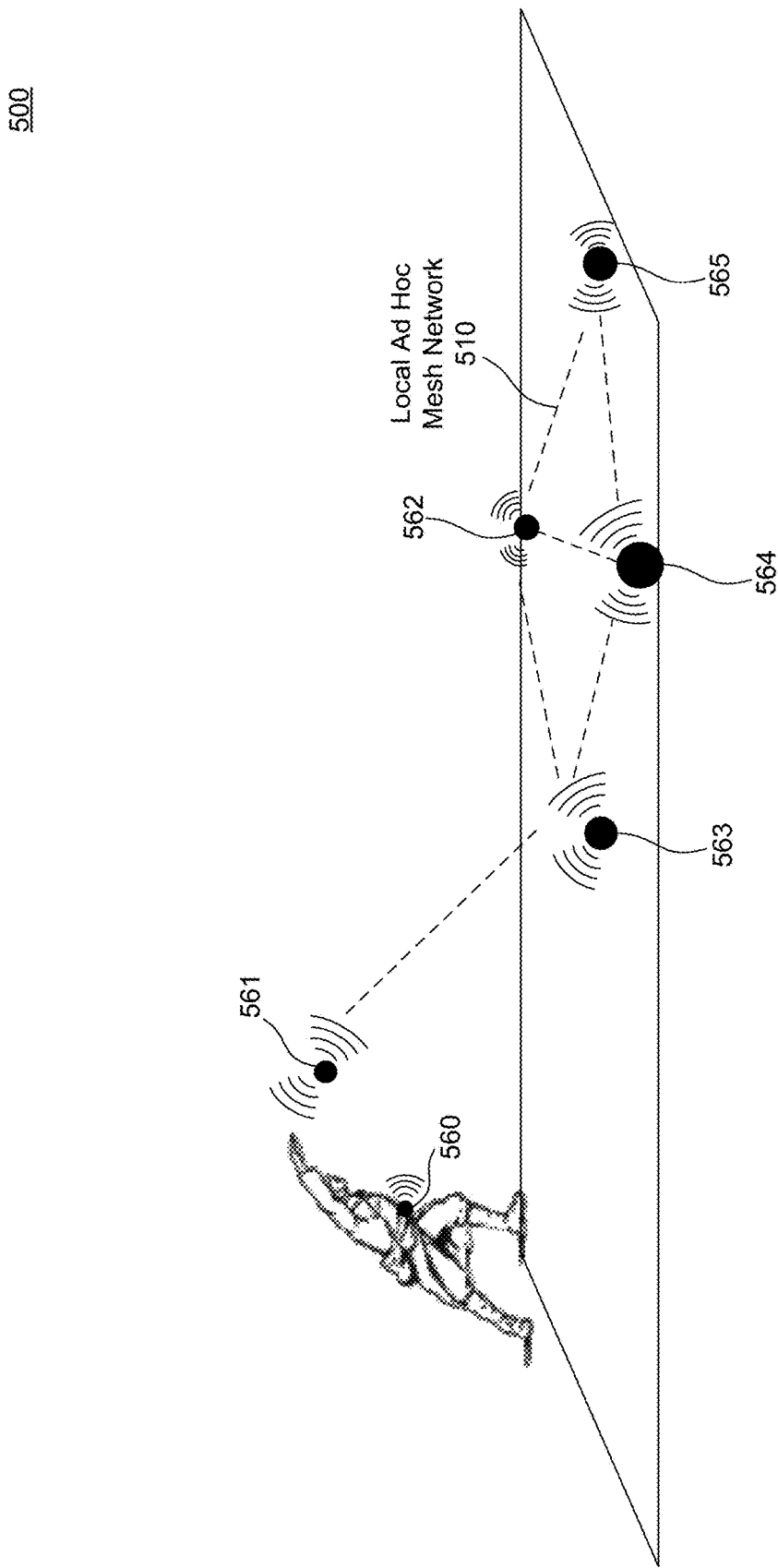
FIG. 5 illustrates deployment of mobile ad-hoc radio-based linked extensible (MARBLE) units according to an embodiment.

FIG. 5 illustrates deployment 500 of a mobile ad-hoc radio-based linked extensible (MARBLE) system according to an embodiment. The form factor enables a field user to carry and deploy wireless transceiver units (e.g., 560-565) by throwing, dropping and placing them into the field in an area to create a local area ad hoc network 510 similar to local ad hoc mesh network 210. A MARBLE system's advantages include the ability for a field operator to carry units that are self-contained, do not require pre-existing infrastructure or affixing apparatus, and the ability to deploy them into the environment in places which may not be easily accessible. For example, for responders entering a building with limited radio coverage, it is possible to deploy MARBLE systems as an ad hoc network by dropping or throwing MARBLE units on various floors of a building as they proceed through the building, thereby ensuring connectivity. Further, MARBLE units may also be inconspicuous objects which can placed or hidden in an environment for stealth surveillance, monitoring and communication.

There may exist a software module coupled to each MARBLE unit that exchanges administrative messages designating one or more MARBLE units which have interoperability gateway functions and thus have wide area communications connectivity to administrative module 222 or a wide area data communications network (e.g., IP network 204) to serve as a relay gateway for other MARBLE units coupled to a local area ad hoc network (e.g., local ad hoc mesh network 510 which is substantially the same as local ad hoc mesh network 210). Designation of a MARBLE unit as a relay gateway (e.g., MARBLE unit 560) may be dynamically assigned based upon rules and parameters including but not limited to a signal strength, a processor speed, a bandwidth throughput, a relative number of transmission links to peer MARBLE units, or a battery power. Further, when mesh connected, devices associated with the relay gateway (e.g., MARBLE unit 560 similar to personal wearable micro-server 260) may electronically, transmit, receive, or store threshold parameters of one or more devices associated with a second MARBLE unit (e.g., MARBLE unit 565 which is substantially similar to personal wearable micro-server 261 that is carried or worn by field personnel 212). For example, an equivalent monitoring module 256 associated with MARBLE unit 560 may perform one or more functions in substitution for an equivalent monitoring module 257 associated with MARBLE unit 565 based upon certain parameters such as an application or device failure or low power source condition.

Figure 6:
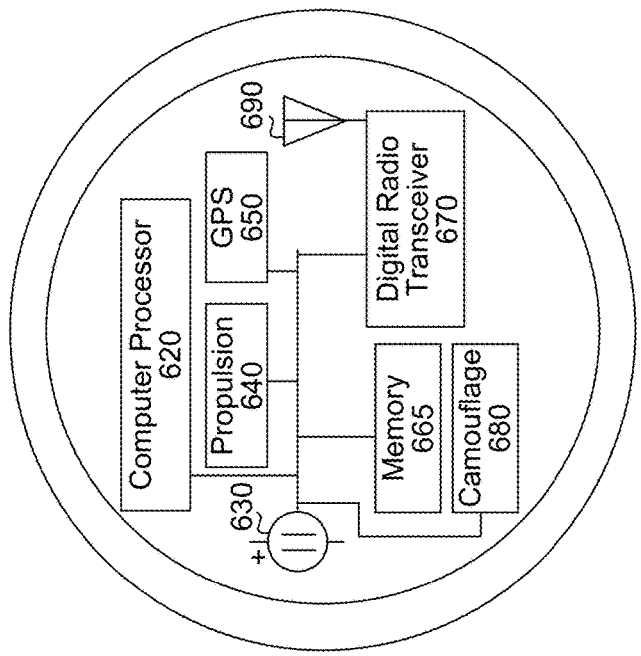
FIG. 6 illustrates a system for a MARBLE unit according to an embodiment.
Figure 6:
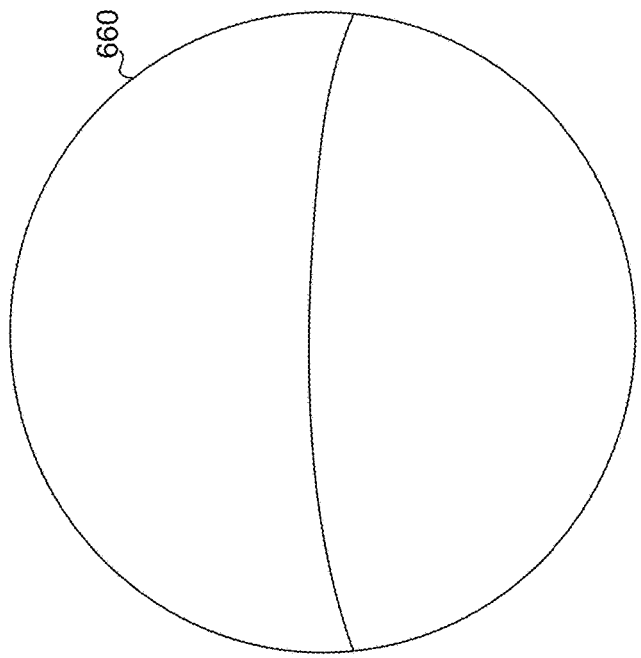

FIG. 6 illustrates a system 600 for a MARBLE unit according to an embodiment. A MARBLE system includes an enclosure 660, a digital radio transceiver 670, a computer processor 620 including but not limited to a system on a chip (SOC) or an embedded computer, an internal power source 630, an antenna 690, a propulsion module 640, a memory 665, a camouflage module 680, and GPS 650. A MARBLE system includes software application that enables ad hoc mesh network communications with other MARBLE systems and other compatible radio transceiver enabled devices that may be coupled to a MARBLE system.

Other MARBLE unit design features follow.

Enclosure Material. A MARBLE enclosure may be made of rubber, metal, or materials that are optimized for various environments and uses. These include temperature resistance and fire resistance, heat dissipation, chemical and radiological resistant materials, pierce, crush, and impact resistance materials, either alone or in combination with others, in layers or in disposition. MARBLE systems may also be constructed or coated with a malleable material that may be shaped in the field such as polymer materials.

Vents and Heat Dissipation. A MARBLE Unit may have air convection vents enabling airflow between the interior and ambient exterior environment, or may have heat sinks and fins for heat transfer and radiation to the exterior ambient environment.

Self-Destruct Components. A MARBLE system may contain one or more components enabling the automatic and/or event triggered destruction of itself and other MARBLE systems. Components may include a software module which has a time based trigger, a tampering sensor or other event-based trigger mechanism that electronically transmits a self-destruction command to the computer processing module for a software self-destruction (e.g., to randomize the computer memory, execute malicious code which interferes with the execution of the computer bios, operating system kernel and/or applications thereon), or activates a trigger mechanism which initiates physical destruction of the MARBLE Unit, such as a thermite or other explosive discharge. A destruct message may also be remotely triggered via message received over a communications channel between the MARBLE Unit and anther computer application.

Ports. A MARBLE Unit may contain ports which are exposed to the exterior surface. They may be communications ports such as USB, Ethernet or serial ports, and/or power ports such as AC or DC power connection ports. Ports may also be contained within a MARBLE Unit and may be accessed by opening a MARBLE unit through a removable or hinged access door or port area, or by opening the entire unit at an accessible seam or junction point.

Power Collection. MARBLE units may have photovoltaic materials affixed or part of the exterior surface material. These cells may be connected to rechargeable battery components located within the MARBLE Unit.

Shapes. MARBLE units may be of any shape including spheres, rectangles, squares, cones or any other three dimensional shape.

Self-Propulsion and Alignment. MARBLE Units may contain self-propulsion capabilities such as an electric motor powering an interior or exterior track mechanism, exterior wheels, legs or other mechanical elements, or rotator blades enabling the MARBLE Units to move upon or over the ground to a desired location and/or adjust a position. The MARBLE units may contain a navigation and control module that enables a MARBLE Unit to execute a plan of movement to a location, and to determine desired location in relation to other MARBLE units. This may be accomplished using rules and parameters based upon the location of other MARBLE units, and the relative signal strength or data connection quality between or among other MARBLE Units. Factors which may be considered include proximity to field-user based devices or other MARBLES, radio signal strength, environmental interference, quality of service measured by bit error rate, a unit's actual or relative power levels, processer load, memory, temperature and other factors.

In an embodiment, computer processor 620 (e.g., one or more processors) electronically receives a propulsion message, determines the desired location in relation to the one or more portable mesh-capable radio transceiver systems, determines a plan of movement to the desired location, and electronically executes the plan of movement using the self-propulsion component. In an embodiment, plan of movement is determined based on a rule and a parameter including at least one of: a location of the one or more portable mesh-capable radio transceiver systems, a relative signal strength of the portable system, a relative signal strength of one of the one or more portable mesh-capable radio transceiver systems, a proximity to a device associated with a field-user, a proximity to one of the one or more portable mesh-capable radio transceiver systems, a radio signal strength, an environmental interference, a quality of service, a power level, a processor load, a memory, a temperature, or another factor.

Camouflage. A MARBLE unit may camouflage itself using one or more camera sensors coupled to a software module (e.g., camouflage 680) which computer processor 620 uses to interprets colors, brightness and patterns in its immediate vicinity based upon photo information inputs from a camera sensor. The exterior of a MARBLE unit may have light emitting diode materials applied, embedded or part of its exterior, such organic light emitting diodes (OLEDs). Based upon the interpreted vicinity data, computer processor 620 may send control signals to the LEDs to display a color, pattern and brightness corresponding with the interpreted vicinity data. For example, if a MARBLE is located in green grass, the camera would capture an image of the grass in its view, send the image data to the software module used by computer processor 620 to interpret colors, patterns and brightness of the image data, create a three dimensional image file of the MARBLE unit's shape and create an applied exterior image file. In an embodiment, computer processor 620 would then send control messages to the exterior LEDs to display the exterior image file periodically, intermittently, or on request. As brightness, color or patterns from the environment change, the computer module would interpret the new environmental data obtained for the camera sensor and adjust the exterior pattern file and then send new commands to the LEDs to change to the new exterior pattern.

Figure 7A:
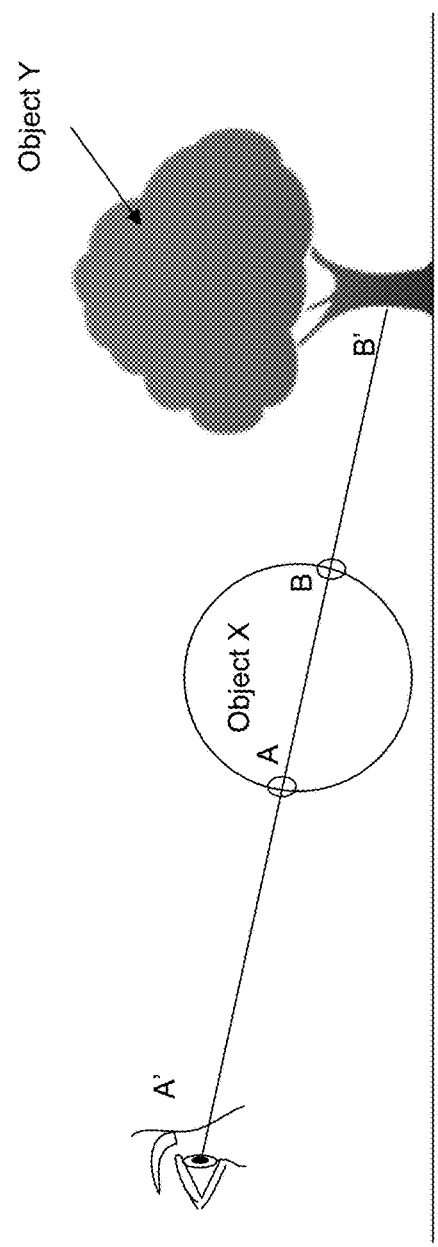
FIG. 7A illustrates an example of sensor pairing according to an embodiment.

Means of Camouflage: Using paired camera sensor and LEDs for view correspondent camouflaged display. FIG. 7A illustrates an example 700A of sensor pairing according to an embodiment. For any three dimensional object there exists a point A on the surface of the object X which corresponds to a point B on a line segment on the opposite side of the object X. This imaginary line segment may be extended in one direction to a point A' which corresponds with a vantage point, and to another point B' on another object Y on the other side of the subject object.

If a Camera sensor is located at Point B and is aimed in the same line of path established in the line segment A' to A, then the image from Camera sensor B will be the same as if viewer A' were looking at Point B' and when Object X was not present and obscuring Point B'.

By locating LEDs in an area centered on Point A and relating them to the view field of a Camera sensor at Point B, a software module can process images generated by the Camera sensor B, and then using such image information, modify such image information to proportionately adjust such image to take account of the surface shape at Point A and send control signals to the LEDs in the area centered on Point A to display such image.

In this manner, the image displayed by the LEDs in the area of Point A will appear to a viewer at A' as the image of B', as if Object X was not blocking the view of B'.

In an embodiment, computer processor 620 electronically receives an image data from a first camera sensor (e.g., at Point B) of the one or more camera sensors based on a first local vicinity (e.g., Point B'), electronically interprets at least one of a color, a pattern, or a brightness of the image data, creates an exterior image file using a three dimensional shape of the portable system and the interpreted image data, and electronically transmits the exterior image file to the LED material, where the LED material presents an exterior image to a corresponding portion of the exterior of the portable system (e.g., LEDs in an area centered on Point A).

In another embodiment, the first local vicinity (e.g., Point B') and the corresponding portion of the exterior of the portable system (e.g., Point A) are collinear points on an imaginary line that extends through the portable system, where the first camera sensor (e.g., at Point B) is a collinear point on the imaginary line between the first local vicinity (e.g., Point B') and the corresponding portion (e.g., Point A).

Figure 7B:
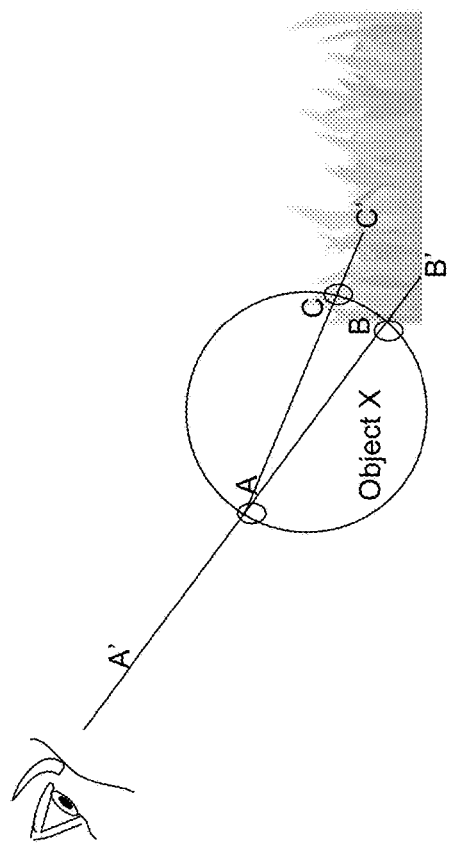
FIG. 7B illustrates an example of offset sensor pairing according to an embodiment.

Offset camera sensor pairing. FIG. 7B illustrates an example of offset sensor pairing according to an embodiment. The system 700B above can employ many camera sensors and correspondent LEDs. A camera sensor may be located in an offset position (e.g., Point C) from a line of view segment such as segment AB, where the lens of the camera sensor may be oriented in a line of view which intersects an object which is proximate to B'. This may be done in cases where the camera sensor lens at Point B collinear to the imaginary line AB' is obscured from a view by darkness or close proximity to an object (e.g., the ground or a different object) such that the camera sensor lens cannot focus. In an embodiment, a camera sensor at an offset point, Point C, close to Point B, that is collinear to the imaginary line AC' provides an approximate image as if viewer A' were looking at Point B' and when Object X was not present and obscuring Point B'.

In an embodiment where the first camera sensor (e.g., at Point B) is obscured, computer processor 620 (e.g., one or more processors) electronically receives a second image data from a second camera sensor (e.g., at Point C) of the one or more camera sensors, where the second camera sensor is offset from the first camera sensor (e.g., at Point B), where the second camera sensor is based on a second local vicinity (e.g., Point C'), and where the second camera sensor is collinear with and between the second local vicinity (e.g., Point C') and the corresponding portion (e.g., Point A). Computer processor 620 electronically interprets at least one of a color, a pattern, or a brightness of the second image data, creates a second exterior image file using a three dimensional shape of the portable system and the interpreted second image data, and electronically transmits the second exterior image file to the LED material, wherein the LED material presents a second exterior image to the corresponding portion (e.g., LEDs in an area centered on Point A).

Changing Exterior Color and Patterns by Remote Control. A MARBLE Unit may be coupled to a software module which can execute commands to change the color, pattern and frequency of change of a MARBLE Unit. These changes may be executed programmatically according to pre-programmed rules or manually by an operator through a user interface to the software module. For example, a MARBLE Unit may be camouflage mode, and an operator may execute a command to change the color pattern to an orange flashing strobe for the purpose of signifying its location to a human. This function may also be executed for two or more MARBLE unit in concert to create a pattern where they are assigned varied colors to assist in evacuation, or synchronized patterns to provide human interpretable context information.

System Implementation

Figure 8:
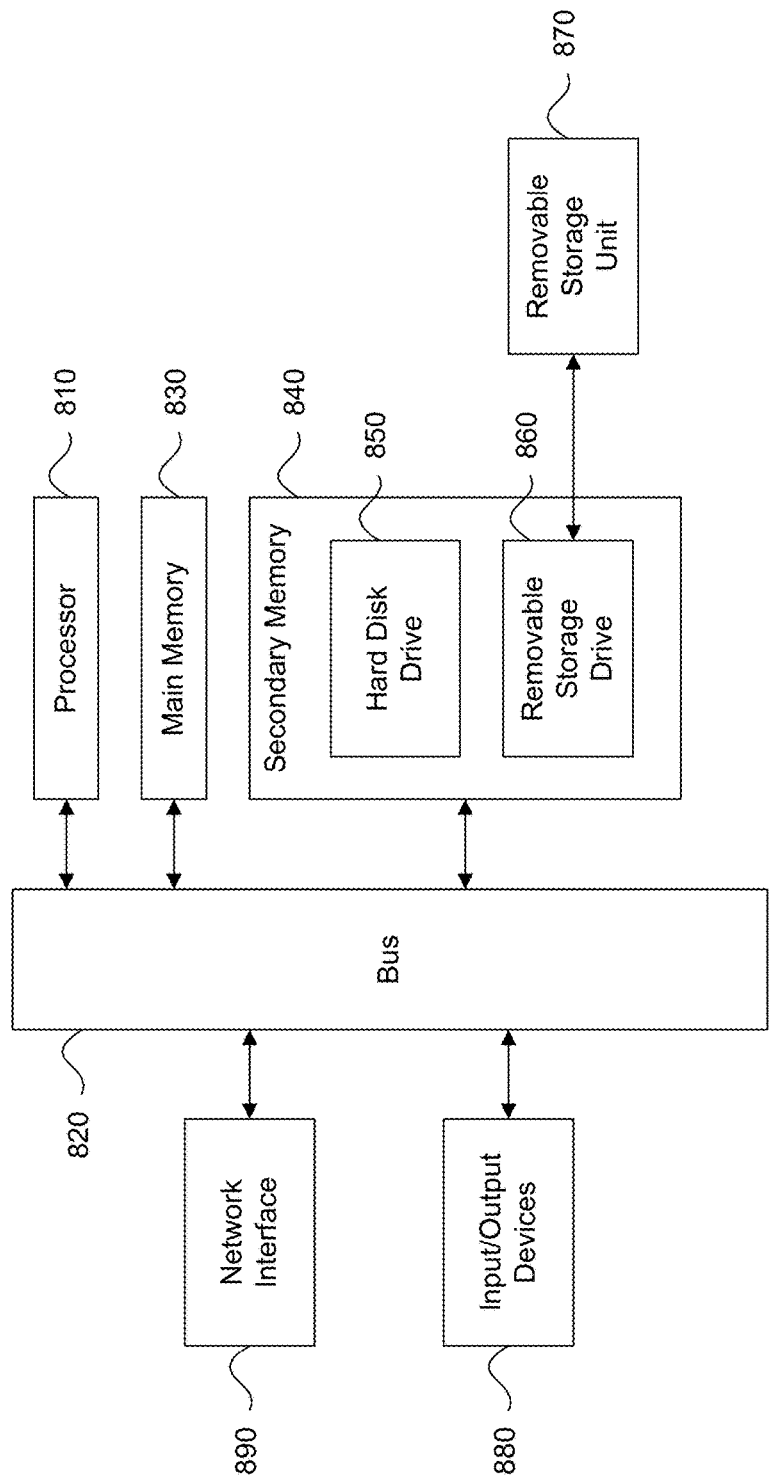
FIG. 8 is an example system useable to implement embodiments.

Various aspects of the invention can be implemented by software, firmware, hardware, or a combination thereof. FIG. 8 illustrates an example system 800 in which the present invention, or portions thereof, can be implemented as computer-readable code and/or text-readable code. After reading this description, it will become apparent to a person skilled in the relevant art how to implement the invention using other systems and/or processing architectures.

Computer 800 includes one or more processors (also called central processing units, or CPUs), such as processor 810. Processor 810 is connected to communication bus 820. Computer 800 also includes a main or primary memory 830, preferably random access memory (RAM). Primary memory 830 has stored therein control logic (computer software), and data.

Computer 800 may also include one or more secondary storage devices 840. Secondary storage devices 840 include, for example, hard disk drive 850 and/or removable storage device or drive 860. Removable storage drive 860 represents a floppy disk drive, a magnetic tape drive, a compact disk drive, an optical storage device, tape backup, ZIP drive, JAZZ drive, etc.

Removable storage drive 860 interacts with removable storage unit 870. As will be appreciated, removable storage unit 860 includes a computer usable or readable storage medium having stored therein computer software (control logic) and/or data. Removable storage drive 860 reads from and/or writes to the removable storage unit 870 in a well-known manner.

Removable storage unit 870, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 800, or multiple computer 800s to perform any combination of the functions described herein.

Computer programs (also called computer control logic) are stored in main memory 830 and/or the secondary storage devices 840. Such computer programs, when executed, direct computer 800 to perform the functions of the present invention as discussed herein. In particular, the computer programs, when executed, enable processor 810 to perform the functions of the present invention. Accordingly, such computer programs represent controllers of the computer 800.

Computer 800 also includes input/output/display devices 880, such as monitors, keyboards, pointing devices, etc.

Computer 800 further includes a communication or network interface 890. Network interface 890 enables computer 800 to communicate with remote devices. For example, network interface 890 allows computer 800 to communicate over communication networks, such as LANs, WANs, the Internet, etc. Network interface 890 may interface with remote sites or networks via wired or wireless connections. Computer 800 receives data and/or computer programs via network interface 890.

CONCLUSION

The invention can be implemented with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A non-transitory computer-readable medium storing instructions that, when executed by a processor of a first electronic device, cause the processor to perform operations, the operations comprising:
    electronically receiving a first biometric signal from a biosensor worn by a user, wherein the biosensor is associated with a first interoperability workstation (IWS);
    electronically determining, using the first biometric signal, that a first event occurs;
    electronically transmitting an activation message to a camera device worn by the user to begin recording and transmitting video data;
    electronically transmitting a first event alert to the first IWS, wherein based on rules of the first IWS, the first IWS establishes a biosensor-triggered multimedia collaboration session including one or more first resources under control of the first IWS including the video data transmitted;
    electronically receiving a second biometric signal from the biosensor;
    electronically determining, using the second biometric signal, that the first event has ceased; and
    electronically transmitting an event-ended message to the first IWS.

2. The non-transitory computer-readable medium of claim 1, wherein the operations further comprise:
    electronically receiving a third biometric signal from a second biosensor, wherein the second biosensor is associated with a different user than that associated with the first body-worn biosensor;
    electronically determining using the third biometric signal that a second event occurs; and
    electronically transmitting an activation message to a second camera device in proximity to the second biosensor to begin recording and transmitting second video data.

3. The non-transitory computer-readable medium of claim 2, wherein the operations further comprise electronically transmitting a second event alert to the first IWS, wherein the first IWS establishes a second biosensor-triggered multimedia collaboration that includes the second video data.

4. The non-transitory computer-readable medium of claim 2, wherein the operations further comprise electronically transmitting a second event alert to the first IWS, wherein the first IWS includes the second video data in the first biosensor-triggered multimedia collaboration.

5. The non-transitory computer-readable medium of claim 1, wherein the first biosensor-triggered multimedia collaboration comprises a first resource that receives the first video data and has voice communications with a user associated with the first body-worn biosensor.

6. The non-transitory computer-readable medium of claim 1, wherein the electronically determining, using the first biometric signal, that the first event occurs operation comprises comparing the first biometric signal with a trigger threshold to detect that the trigger threshold is satisfied, wherein the trigger threshold comprises a criteria, a parameter, a static rule, or a dynamic rule.

7. The non-transitory computer-readable medium of claim 6, wherein the trigger threshold further comprises: a change in a value over time, a rate of change of values over time, correlations with data from a different biosensor sensor, correlations with data from an environmental sensor, correlations with data from a GPS system, a health or a fitness condition of a user associated with the first body-worn biosensor, a condition of other personnel being monitored in proximity to the user, a material rating, a system rating, or a system limit.

8. The non-transitory computer-readable medium of claim 1, wherein the operations further comprise electronically transmitting an audio or visual message to a user associated with the first body-worn biosensor based on: the first biometric signal, an environmental sensor signal, a third biometric signal from another biosensor, or a change in a trigger threshold.

9. The non-transitory computer-readable medium of claim 8, wherein the operations further comprise receiving input from the user via a graphical user interface (GUI), a voice interaction interface, or a gesture recognition interface.

10. The non-transitory computer-readable medium of claim 1, wherein the first biometric signal comprises: a respiration rate, a heart rate, a blood pressure, a perspiration rate, an oxygen level, a body temperature, a voltaic skin response, a bioelectric activity, an altitude, a pitch, a yaw, a rotation or other angular movement, a position, a force, a location, an acceleration, a deceleration, or a change in any of the above.

11. The non-transitory computer-readable medium of claim 1, wherein the operations further comprise receiving an environmental condition signal from an environmental sensor in proximity to the first body-worn biosensor comprising: an ambient temperature, a wind chill, a dew point, a radiation level, a chemical level, a biological agent, a sound, a pressure, a humidity level, a precipitation level, an air pollutant level, a lightning strike, a terrain, an altitude, a location, an air quality level, or a change in any of the above.

12. The non-transitory computer-readable medium of claim 1, wherein the operations further comprise electronically transmitting a deactivation message to the camera device to cease recording video data.

13. A method, comprising:
electronically receiving a first biometric signal from a biosensor worn by a user, wherein the biosensor is associated with a first interoperability workstation (IWS);
electronically determining, using the first biometric signal, that a first event occurs;
electronically transmitting an activation message to a camera device worn by the user to begin recording and transmitting video data;
electronically transmitting a first event alert to the first IWS, wherein based on rules of the first IWS, the first IWS establishes a biosensor-triggered multimedia collaboration session including the video data transmitted;
electronically receiving a second biometric signal from the biosensor;
electronically determining, using the second biometric signal, that the first event has ceased; and
electronically transmitting an event-ended message.

14. The method of claim 13, further comprising electronically transmitting a deactivation message to the camera device to cease recording video data.

15. The method of claim 13, further comprising:
electronically receiving a third biometric signal from a second biosensor, wherein the second biosensor is associated with a different user than that associated with the first body-worn biosensor;
electronically determining using the third biometric signal that a second event occurs; and
electronically transmitting an activation message to a second camera device in proximity to the second biosensor to begin recording and transmitting second video data.

16. The method of claim 15, further comprising electronically transmitting a second event alert to the first IWS, wherein the first IWS establishes a second biosensor-triggered multimedia collaboration that includes the second video data.

17. The method of claim 15, further comprising electronically transmitting a second event alert to the first IWS, wherein the first IWS includes the second video data in the first biosensor-triggered multimedia collaboration.

18. A non-transitory computer-readable medium storing instructions that, when executed by a processor of a first electronic device, cause the processor to perform operations for a first interoperability workstation (IWS), the operations comprising:
electronically receiving an event alert, wherein the event alert is determined from a first biometric signal from a body-worn biosensor, wherein the body-worn biosensor is associated with the first IWS;
based on the event alert, establishing a biosensor-triggered multimedia collaboration that includes video data from a camera device, wherein the camera device is activated based on the event alert;
electronically receiving an event-ceased message, wherein the event-ceased message is based on a determination using a second biometric signal from the body-worn biosensor, that the first event has ceased; and
determining whether to end the biosensor-triggered multimedia collaboration.

19. The non-transitory computer-readable medium of claim 18, wherein the operations further comprise:
electronically transmitting an invitation to the biosensor-triggered multimedia collaboration to a second IWS;
electronically receiving an acceptance from the second IWS; and
bridging a second resource under control of the second IWS to the biosensor-triggered multimedia collaboration, wherein the second resource receives the video data in real time, and has voice communications with a user associated with the body-worn biosensor.

20. A system comprising:
one or more processors;
a memory coupled to the one or more processors, wherein the one or more processors are configured to:

electronically receive a first biometric signal from a biosensor worn by a user, wherein the biosensor is associated with a first processing device;

electronically determine, using the first biometric signal, that a first event occurs;

electronically transmit an activation message to a camera device worn by the user to begin recording and transmitting video data;

electronically transmit a first event alert to the first processing device, wherein based on rules of the first processing device, the first processing device establishes a biosensor-triggered multimedia collaboration session including one or more first resources under control of the first processing device including the video data transmitted;

electronically receive a second biometric signal from the biosensor;

electronically determine, using the second biometric signal, that the first event has ceased; and electronically transmit an event-ended message-to the first-processing device.

\* \* \* \* \*